United States Patent  
Guirado et al.

(10) Patent No.: US 11,169,806 B1  
(45) Date of Patent: Nov. 9, 2021

(54) DATA PROCESSING SYSTEMS

(71) Applicant: Arm Limited, Cambridge (GB)

(72) Inventors: Antonio Garcia Guirado, Trondheim (NO); Marcelo Orenes Vera, Trondheim (NO)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/989,801

(22) Filed: Aug. 10, 2020

(51) Int. Cl.
G06F 12/128 (2016.01)
G06F 9/30 (2018.01)
G06F 13/16 (2006.01)
G06F 12/0891 (2016.01)
G06F 12/0868 (2016.01)

(52) U.S. Cl.
CPC ...... G06F 9/30047 (2013.01); G06F 9/30043 (2013.01); G06F 12/0868 (2013.01); G06F 12/0891 (2013.01); G06F 13/1673 (2013.01)

(58) Field of Classification Search
CPC .... G06F 13/12; G06F 12/128; G06F 12/0804; G06F 12/0891; G06F 2212/1024; G06F 2212/1044
USPC .......................................................... 711/118
See application file for complete search history.

(56) References Cited

U.S. PATENT DOCUMENTS 6,823,427 B1 * 11/2004 Sander ................ G06F 12/0864  
    711/118  
8,010,745 B1 * 8/2011 Favor ..................... G06F 9/3834  
    711/118  
8,019,944 B1 * 9/2011 Favor ..................... G06F 9/3873  
    711/118  
8,024,522 B1 * 9/2011 Favor ..................... G06F 9/3851  
    711/118  
8,370,576 B1 * 2/2013 Favor ..................... G06F 9/3863  
    711/118  
10,157,132 B1 12/2018 Fielding  
2006/0004961 A1 * 1/2006 Tu ........................ G06F 12/0835  
    711/119  
2008/0024506 A1 1/2008 Lindholm  
2011/0208916 A1 * 8/2011 Saito .................... G06F 1/3203  
    711/130  
2011/0238634 A1 * 9/2011 Kobara ................ G06F 3/0608  
    707/692  
2013/0304991 A1 * 11/2013 Bottcher .............. G06F 12/0864  
    711/122

(Continued)

Primary Examiner — Titus Wong  
(74) Attorney, Agent, or Firm — Vierra Magen Marcus LLP

(57) ABSTRACT

In a data processor comprising a processing pass circuit and a cache, a record of processing passes to be performed by the processing pass circuit is stored, including storing, for each processing pass recorded in the buffer: information indicative of any data that is required for performing the processing pass that is not yet stored in the cache, including an identifier for any data that is required for performing the processing pass that is not yet stored in the cache. When new data to perform a processing pass is loaded into the cache, an identifier for that new data is compared to any identifiers for data that processing passes in the processing pass record are waiting for, and the information indicative of any data that is required for performing processing passes that is not yet stored in the cache stored in the processing pass record is updated.

23 Claims, 11 Drawing Sheets

(56) References Cited

U.S. PATENT DOCUMENTS

| | | | |
|---|---|---|---|
| 2014/0089592 A1* | 3/2014 | Biswas | G06F 1/3225 |
| | | | 711/133 |
| 2014/0267259 A1 | 9/2014 | Frascati | |
| 2016/0196633 A1* | 7/2016 | Charles | G06F 12/0864 |
| | | | 345/501 |
| 2017/0053375 A1 | 2/2017 | Bolz | |
| 2018/0286010 A1* | 10/2018 | Koker | G06F 12/0815 |

* cited by examiner

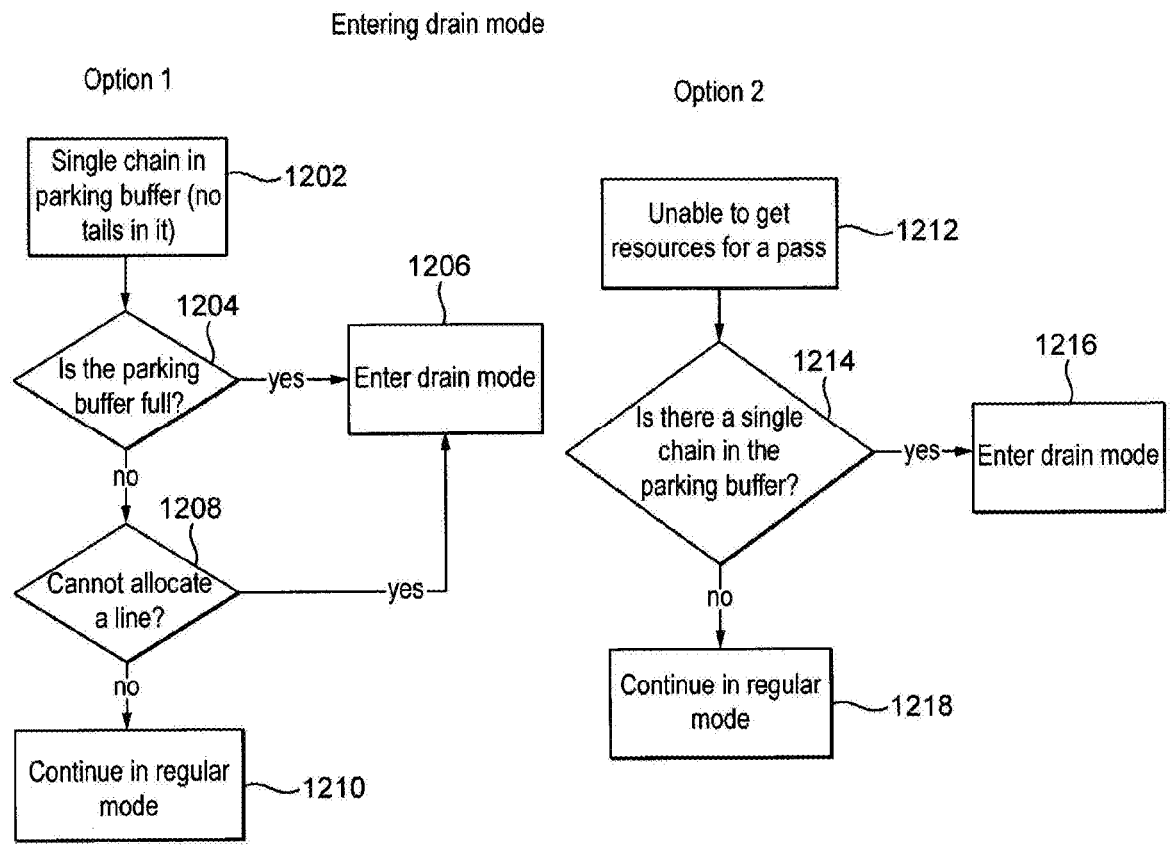
FIG. 11 A
FIG. 11 B
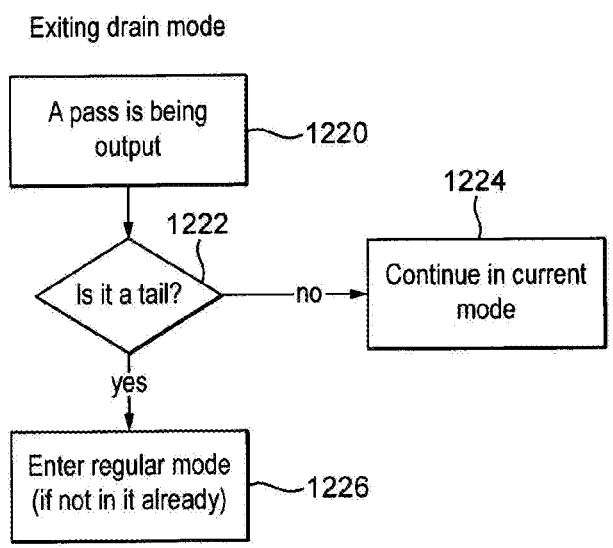
FIG. 11 C

DATA PROCESSING SYSTEMS

BACKGROUND

The technology described herein relates to data processing systems and in particular to cache operation in data processing systems.

Many data processing systems use caches to store data, etc., locally to a processing unit or units so as to reduce the need to fetch data from slower data stores, such as main memory of the data processing system.

In such arrangements, it will first be determined whether the data needed for a processing operation is available in the appropriate cache. If the data is present in the cache (there is a cache "hit"), then the data can be read from the cache, rather than from the main data store where it is stored, thereby allowing the processing operation to proceed more rapidly. On the other hand, if the data is not present in the cache (there is a cache "miss"), then the process will operate to first fetch the relevant data into the cache, with the processing operation being stalled until the relevant data is stored in the cache.

The Applicants believe that there remains scope for improvements to cache operation in data processing systems.

BRIEF DESCRIPTION OF THE DRAWINGS

A number of embodiments of the technology described herein will now be described by way of example only and with reference to the accompanying drawings, in which:

FIGS. 11A, 11B and 11C show methods of entering and exiting a mode of operation in which processing passes are drained from a record of processing passes stored in a buffer in an embodiment of the technology described herein.

Like reference numerals are used for like components where appropriate in the drawings.

DETAILED DESCRIPTION

Figure 1:
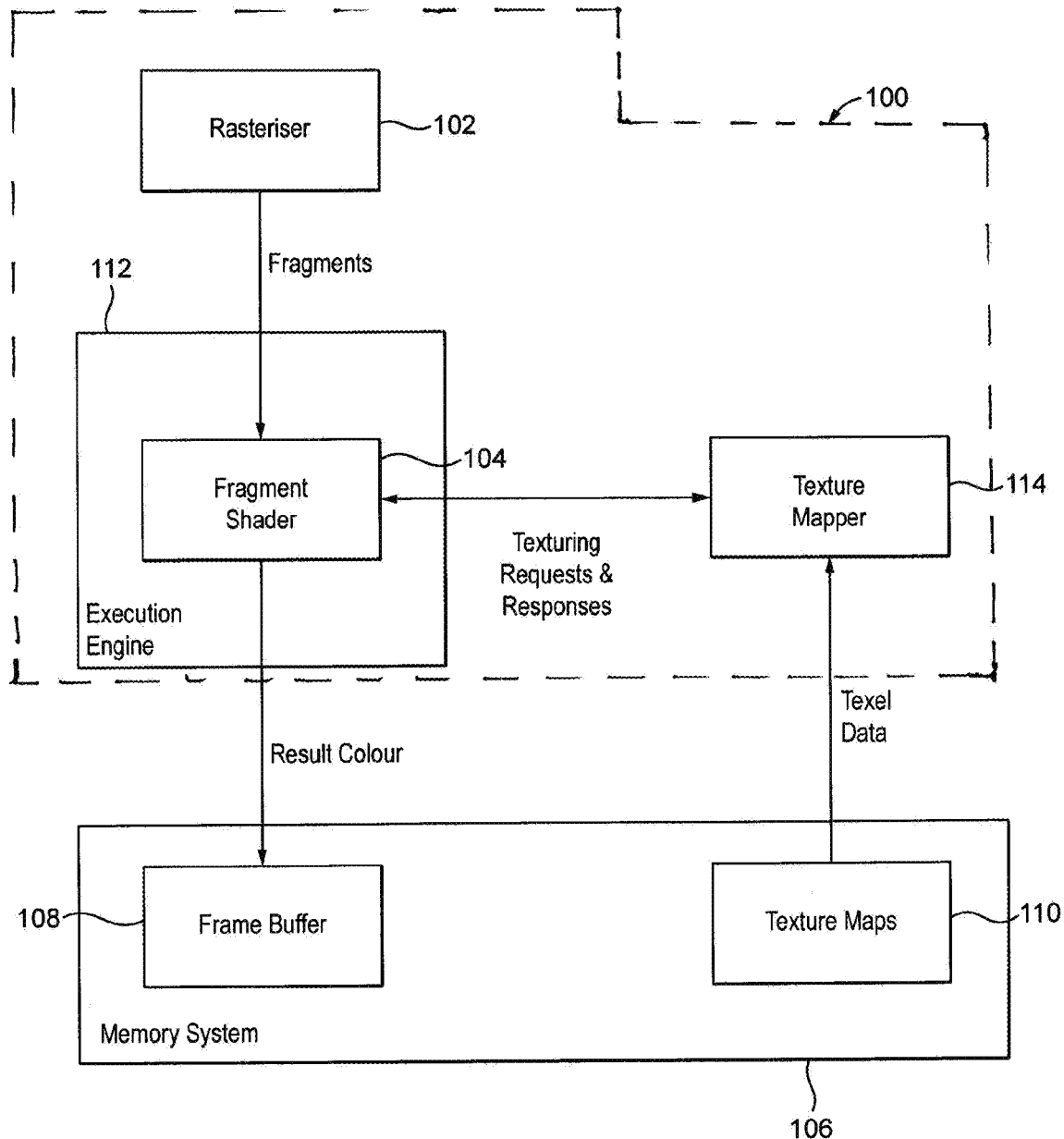
FIG. 1 shows schematically a graphics processing system in which the technology described herein can be used.

A first embodiment of the technology described herein comprises a method of operating a data processor, the data processor comprising:

a processing pass circuit configured to perform processing passes for data processing operations; and a cache associated with the processing pass circuit for storing data required by the processing pass circuit when performing processing passes for data processing operations;

the method comprising:

storing, in a buffer, a record of processing passes to be performed by the processing pass circuit for data processing operations, including storing, for each processing pass that is recorded in the buffer:

information indicative of any data that is required for performing the processing pass that is not yet stored in the cache, including an identifier for any data that is required for performing the processing pass that is not yet stored in the cache;

the method further comprising:

when new data required by the processing pass circuit to perform a processing pass for a data processing operation is loaded into the cache:

for each processing pass that is recorded in the buffer and that is awaiting data to be stored in the cache:

comparing an identifier for the new data that has been loaded into the cache to any identifiers for the processing pass for data that is required for performing the processing pass that is not yet stored in the cache;

determining, based on the comparison for the processing pass, whether the new data that was loaded into the cache is data that the processing pass was waiting for; and when it is determined for the processing pass that the new data that was loaded into the cache was data that the processing pass was waiting for, updating the information indicative of any data that is required for performing the processing pass that is not yet stored in the cache for the processing pass.

A second embodiment of the technology described herein comprises a data processor, the data processor comprising:

a processing pass circuit configured to perform processing passes for data processing operations;

a cache associated with the processing pass circuit for storing data required by the processing pass circuit when performing processing passes for data processing operations;

a buffer for storing a record of processing passes to be performed by the processing pass circuit for data processing operations; and a buffer management circuit configured to:

add processing passes to be performed by the processing pass circuit for data processing operations to the record of processing passes in the buffer, including storing, for each processing pass that is recorded in the buffer:

information indicative of any data that is required for performing the processing pass is not yet stored in the cache, including an identifier for any data that is required for performing the processing pass that is not yet stored in the cache;

the buffer management circuit further configured to:

when new data required by the processing pass circuit to perform a processing pass for a data processing operation is loaded into the cache:

for each processing pass that is recorded in the buffer and that is awaiting data to be stored in the cache:

compare an identifier for the new data that has been loaded into the cache to any identifiers for the processing pass for data that is required for performing the processing pass that is not yet stored in the cache;

determine, based on the comparison for the processing pass, whether the new data that was loaded into the cache is data that the processing pass was waiting for; and when it is determined for the processing pass that the new data that was loaded into the cache was data that the processing pass was waiting for, update the information indicative of any data that is required for performing the processing pass that is not yet stored in the cache for the processing pass.

The technology described herein relates to arrangements in which a circuit operable to perform processing passes for data processing operations of a data processor has an associated cache into which data required by the processing circuit for performing processing passes is loaded, before then being used by the processing pass circuit for performing the required processing passes and data processing operations.

In the technology described herein, a record of processing passes to be performed by the processing pass circuit and that are awaiting data to be fetched into the cache in order to be able to be performed is maintained in a buffer. As will be discussed further below, this then facilitates keeping track of processing passes that cannot necessarily be performed straightaway, for example because the data required for performing those processing passes may not yet have been cached.

The Applicants have recognised in this regard that it may often be the case that the data required for a processing pass to be performed may not yet have been cached available for use by a processing pass circuit (i.e. there may be a cache "miss" when the processing pass first falls to be performed). In this case therefore, as discussed above, the processing pass should be stalled until the required data is present in the cache. It would therefore be useful to be able to keep track of which processing passes are waiting for data to be loaded into the cache, and also to be able to identify when the data that is being waited for has entered the cache.

The technology described herein facilitates this by maintaining a buffer (a "parking buffer") that stores a record of processing passes to be performed by the processing pass circuit that are awaiting data to be fetched into the cache. The buffer accordingly stores processing passes while they wait for data to be fetched into the cache. By "parking" processing passes in the parking buffer (and "unparking" ready processing passes from the buffer), any cache miss latency can, in effect, be hidden, and thus "full" throughput per cycle achieved.

As part of the relevant processing pass record in the "parking" buffer, information indicative of whether the processing pass in question is waiting for any data, including an identifier for any data that is required by the processing pass circuit for performing the processing pass that is not yet stored in the cache, is maintained and stored.

Then, when new data is loaded into the cache (e.g., and in an embodiment, there is a "line fill" in the cache), (at least) for each processing pass that is recorded in the buffer and that is awaiting data to be fetched in the cache, an identifier for the new data that has been loaded into the cache is compared to the identifier(s) for any data that is required for the processing pass and that is not yet stored in the cache, to determine whether the new data loaded into the cache is needed for the processing pass. The information indicative of whether the processing pass is waiting for data is then updated accordingly (and if appropriate).

It should also be noted in this regard that the technology described herein operates by providing the identity of the data that is newly loaded into the cache to the buffer that stores the record of the waiting processing passes, with that data identity then being compared to the indications of the data that is being waited for for the processing passes recorded in the buffer.

In other words, for each new set of data that is loaded into the cache, the identity of that data is compared to the record of data that is being waited for for all the entries in the parking buffer (at least that are waiting for data).

This then has the effect of allowing all the processing passes that are "parked" in the buffer and waiting for the data that has been loaded into the cache to be identified at the same time and when the data in question is first loaded into the cache.

This then allows, for example, any processing passes that are waiting only for the new data that is loaded into the cache to be immediately identified as being ready for processing when the data in question is loaded into the cache.

As will be discussed further below, this arrangement of the technology described herein accordingly can facilitate significantly higher throughput in terms of releasing and executing processing passes that have been "parked" while waiting for data to be fetched into a cache, for example as compared to arrangements which operate on a "first in first out" (FIFO) basis, or that, for example, simply test one or a few "parked" processing passes against the cache at a time.

This then means that the throughput of processing passes through the parking buffer and cache system can be significantly improved in terms of speed (e.g. in terms of the number of threads per cycle that can be issued).

Thus, and as will be discussed further below, the technology described herein facilitates, inter alia, the storing and handling of processing passes while waiting for data to be cached, and the detection of processing passes that are ready for processing, in a faster and/or more (e.g. energy) efficient manner.

The technology described herein can be used in any system and data processor where processing passes for performing data processing operations may need to wait for data to be fetched into a cache before being performed. Thus the data processor may be any suitable and desired data processor in which such situations can arise. However, as will be discussed further below, the Applicants have recognised that such situations (the need for processing passes to wait for data to be fetched into a cache) may in particular arise in the context of graphics processing and graphics processors, and so in an embodiment, the data processor is a graphics processor.

Correspondingly, the processing passes and data processing operations that are to be performed in the technology described herein can be any suitable and desired processing passes and data processing operations, but in an embodiment, the processing passes comprise processing passes for graphics processing operations (and the data processing operations comprise graphics processing operations).

Correspondingly, the data that is to be fetched into the cache can comprise any suitable and desired data that may be required for a processing pass for a data processing operation, but in an embodiment is graphics data that is required for a processing pass for performing a graphics processing operation.

The processing pass circuit can correspondingly be any circuit that is configured to perform processing passes for data processing operations, but in an embodiment comprises a circuit configured to perform processing passes for graphics processing operations.

The Applicants have recognised that the technology described herein may be particularly suitable and beneficial for use when performing graphics texture processing operations, e.g. which typically use many processing passes and relatively large sets of input data values, and so can encounter many (texture) cache misses in use.

Thus, in an embodiment the processing pass circuit is a graphics texture processing pass circuit (e.g. of a texture mapper (texture mapping circuit)), the processing passes comprise processing passes for graphics texture processing (mapping) operations, the cache is a texture cache, and the data that is required when performing the processing passes comprises graphics texture data (e.g., and in an embodiment, texel data (values)).

In the graphics texture processing case (and otherwise) the data processing operation to be performed may, and in an embodiment does, comprise a filtering operation, such as bilinear interpolation, trilinear interpolation or a higher order multilinear interpolation, etc. Correspondingly, a given processing pass to be performed by the processing pass circuit may comprise a filtering pass, such as a bilinear or trilinear interpolation pass.

Other arrangements in which the parking buffer operation in the manner of the technology described herein could be particularly useful include, in a graphics processor and graphics processing context, the interpolation of vertex attributes (i.e. for the vertex cache, with the processing passes comprising vertex attribute interpolation operations). The interpolation of vertex attributes may again encounter multiple cache misses, so a parking buffer arrangement in the manner of the technology described herein may be advantageous in the context of the vertex cache and vertex attribute interpolation operations. In this case, there may be fewer cache misses per processing pass and shorter sequences of associated processing passes than in the texture processing case, but otherwise the operation can be the same.

The operation in the manner of the technology described herein may also correspondingly be useful where descriptors that needed to be processed together are being loaded (such that the descriptors that need to be processed together are arranged as a sequence of associated processing passes, with one pass per descriptor), or where loading, e.g. encryption/compression, headers that are needed together, e.g. in the case where one encryption header is needed for the luma component and another for the chroma components, such that the loading of the headers may be configured as a sequence of associated processing passes, with one pass per header.

Other arrangements, would, of course, be possible.

The technology described herein relates in particular to the situation where the processing pass circuit is to perform processing passes for data processing operations. The need for the processing pass circuit to perform processing passes for data processing operations can be indicated and triggered in any suitable and desired manner.

In an embodiment, an appropriate request for processing operations to be performed by the processing pass circuit are made, e.g., and in an embodiment, by another element (processing circuit) of the data processor. For example, in the case of a graphics processing texture mapping operation, an appropriate rendering circuit (e.g. fragment shader circuit) of the graphics processor may send requests for texture mapping operations to a texture mapping circuit of the graphics processor, which texture mapping circuit of the graphics processor then operates to perform processing passes to perform the requested texture mapping operations.

One or more requests for data processing operations and processing passes to be performed by the processing pass circuit may be made during a given cycle of operation.

A (and each) processing request should be configured to and indicate all the information that is necessary to determine the data processing operation and processing passes to be performed for the request. Thus a processing request will, for example, and in an embodiment, indicate the data processing operation is to be performed, and the data that is to be used (and that is required) for that data processing operation.

A given data processing operation may comprise and be performed using a single processing pass, or a given data processing operation could comprise and be performed using a sequence of plural processing passes. This may depend, for example, on what processing passes the process pass circuit performs and/or supports, and the required data processing operation. For example, a trilinear filtering operation may be performed as (and comprise) a sequence of two bilinear filtering processing passes.

Thus, in an embodiment, a given data processing operation can comprise a sequence (a "chain") of plural related processing passes (e.g., and in an embodiment, in which a later processing pass in the sequence is dependent on the result of an earlier processing pass in the sequence (chain)).

Correspondingly, the Applicants have recognised that it may be desirable to associate plural processing passes that are stored in the processing pass record in the buffer with each other, so as to indicate that that set of processing passes in the processing pass record should be performed as a sequence of processing passes together.

Thus, in an embodiment a set of one or more, and in an embodiment of plural, processing passes in the buffer can be associated with each other to indicate that the processing passes in the set should be performed as a sequence of processing passes together.

In this case, the processing passes in the sequence of associated processing passes that are to be performed together (e.g. for a given data processing operation) should be, and are in an embodiment stored as respective separate processing passes in the (parking) buffer, but are in an embodiment associated with each other, so that all the processing passes making up the sequence of processing passes that are to be performed together, e.g. for a particular data processing operation, can be identified in the (parking) buffer.

Thus, in an embodiment, the record of processing passes to be performed by the processing pass circuit stored in the buffer can, and in an embodiment does, comprise and indicate, one or more sequences of related and associated processing passes, with each such sequence comprising a set of processing passes that are to be performed together, e.g. to perform a given, particular, data processing operation.

A set of processing passes may be performed and arranged as a sequence of associated processing passes for any suitable and desired reason, and in any suitable and desired manner. For example, in some cases a data processing operation may be performed and arranged as a sequence of "temporally related" processing passes (i.e. in which a later processing pass in the sequence is dependent upon the result of an earlier processing pass in the sequence).

Thus in one embodiment, plural processing passes (e.g. for a given data processing operation) that are to be performed as a sequence of "temporally related" processing passes (i.e. in which a later processing pass in the sequence is dependent on the result of an earlier processing pass in the sequence), are associated with each other in the processing pass record.

This will be applicable in the case, for example, of a higher order multilinear filtering operation, which may be performed as two or more sequential lower order, e.g. bilinear or trilinear, processing passes.

The Applicants have also recognised that it may be appropriate and desirable to perform and arrange processing passes that share some or all of the same input data, and/or for which any required data is likely to be loaded into the cache around the same time, as a sequence of associated processing passes, as it may in that case be expected that the data for all the processing passes in the sequence will be loaded into the cache close in time to each other, such that all the processing passes in the sequence should be expected to become ready for processing close in time to each other.

This could be the case where, for example, the individual processing passes process spatially close (e.g. adjacent) regions from an input data array, as it may then be expected that those passes will share at least some input data, and/or that the data for the processing passes will be fetched into the cache at the same or similar times.

For example, in the case of graphics processing, it may be desired to generate a 2×2 group of pixels for an output frame, with each pixel in that 2×2 group of pixels being correspondingly generated from a 2×2 set of sampling positions in a rendered frame and/or input data array. In this case therefore, the processing passes necessary to process each of the input data elements to provide the "quad" of 2×2 output data elements (pixels) could be associated with each other as a sequence of related processing passes that are to be performed together, as it might be expected that pixels in the 2×2 pixel group will share some input data (use some of the input data in common), and/or that the input data for the 2×2 pixel group will arrive in the cache at similar times (and it would be desirable to use that data from the cache at the same time).

Thus, in an embodiment, plural processing passes (e.g. for a given data processing operation) that are each to process at least some data in common, and/or related, e.g. spatially close, data, are associated with each other as a sequence of processing passes that are to be performed together in the processing pass record.

In general, it would be possible for a processing pass that is stored in the record of processing passes to comprise any desired "unit" of processing (with any corresponding sequence of associated processing passes them being longer or shorter, depending upon what each individual "processing pass" that is recorded in the buffer represents). For example, each processing pass that is recorded in the processing pass parking buffer could represent the processing for a single pixel of a 2×2 pixel group, or could represent the processing for a complete 2×2 pixel group (or a tri-linear, or 2x anisotropic operation for a 2×2 pixel group, for example), with the sequences of associated processing passes correspondingly linking a set of such processing passes together. In the case where each processing pass corresponds to the processing for a 2×2 pixel group, each processing pass that is recorded in the record would, in effect, be "fatter" than in the case where the individual processing passes that are recorded in the buffer correspond to single pixels of a 2×2 pixel group (and the sequences of associated processing passes would correspondingly be shorter).

Thus, in general, the processing passing record in the buffer can record and track processing passes at any desired level of granularity in terms of the processing that the processing passes correspond to, and, e.g., in terms of the sub-division of any given data processing operation into respective processing passes that are recorded in the buffer, with any sequences of associated processing passes in the record correspondingly being longer or shorter, as desired. Thus, in general, the processing pass record can record any suitable and desired processing passes that may be performed by the processing pass circuit and by the data processor in question.

A request for a data processing operation may be in the form of a sequence of one or more processing passes, and/or indicate the sequence of one or more processing passes to be performed, so that the processing passes to be performed for the data processing operation are already specified. Alternatively, a given data processing operation that is requested may first be converted into an appropriate sequence of one or more processing passes for performing the desired data processing operation (with those processing passes then being appropriately "parked" in the buffer).

Thus, in an embodiment, the data processor further comprises a processing pass generating circuit configured to convert (and the method comprises converting) a data processing operation to be performed into an appropriate sequence of one or more processing passes to be performed by the processing pass circuit to perform the data processing operation.

Thus, in an embodiment, data processing operations to be performed will be provided as and/or converted into sequences of one or more processing passes to be performed by the processing pass circuit.

Each processing pass will operate on and require one or more input data values. For example, in the case of a bilinear filtering processing pass, the processing pass will require four input data values. For trilinear filtering, eight input data values will be required.

In the present embodiment, the input data values that are required for the processing passes are stored in, and used by the processing pass circuit from, a cache of the data processor and that is associated with the processing pass circuit. As discussed above, in the case of graphics texture mapping, the cache will be an appropriate texture cache of the graphics processor.

The processing pass circuit will, when performing a processing pass, accordingly read the required input data values from the associated cache, process those input data values appropriately, and, e.g., and in an embodiment, return the corresponding output data value or values (the result of the processing pass) appropriately, e.g. by storing it in another cache and/or writing it out to memory, and/or by providing it to the processing element (circuit) that requested the data processing operation in question.

The cache that stores the data for use by the processing circuit when performing processing passes can be any suitable and desired cache of the data processor, and can operate in any desired and suitable manner. Subject to any operation that is required for the technology described herein, the cache can, and in an embodiment does, operate in the normal manner for the data processor and data processing system in question, e.g., and in an embodiment in terms of the way that cache operations, such as "misses", line fills, tag updates, etc., are handled, and any eviction/line replacement policy, etc.

Correspondingly, the cache will, and in an embodiment does, comprise a plurality of cache lines (entries), each operable to store one or more data values, and each being tagged with a corresponding identifier which identifies the data that is stored in the cache line (entry) in question. Each entry in the cache (cache line) also in an embodiment has a respective index that identifies that entry in the cache (a cache line index) (and which index, as will be discussed further below, is in an embodiment stored in the parking buffer record for a processing pass to indicate that the processing pass needs the data stored in that cache line).

In an embodiment, a cache status map (e.g. bitmap) for the complete set of cache lines (entries) is also provided and maintained, with the entries (e.g. bits) of the cache status map indicating whether or not the respective cache lines (entries) contain valid data. This cache status map can then be used to check which cache lines (entries) contain valid data.

When a processing pass is to be performed, the processing pass will be performed once the required data for the processing pass is stored in the cache.

The data will be loaded into the cache from a memory system of or accessible to the data processor, such as, and in an embodiment, a main memory of the overall data processing system that the data processor is part of, that stores the data (e.g. the data array (e.g. texture map(s) in the case of graphics texture mapping)) in question.

The buffer in which the record of "parked" processing passes to be performed by the processing pass circuit is stored can be configured in any suitable and desired manner, and use any suitable and desired form of storage (including a mix of storage, if desired). For example, the buffer may be implemented wholly or in part in appropriate random access memory (RAM). However, it is a particular advantage of the technology described herein that the "parking" buffer in which the record of parked processing passes is stored does not need to be implemented in RAM, but can instead be stored in more efficient forms of storage such as, and in an embodiment, registers and/or flip-flops. Indeed, it is an advantage of the technology described herein that it allows the storage of the record of parked processing passes in more efficient storage such as registers and flip-flops to be affordable, thereby avoiding the need to store the parking buffer in RAM.

The record of processing passes to be performed by the processing pass circuit that is stored in the buffer should, and in an embodiment does, comprise a plurality of record entries (slots), with each entry (slot) in the record storing (the information for) a respective processing pass. Thus the record will comprise a plurality of record entries, each storing a respective processing pass.

The record of processing passes stored in the buffer can comprise any suitable and desired number of processing passes. In an embodiment, the buffer is configured to store up to a particular, in an embodiment selected, in an embodiment predetermined, (maximum) number of processing passes. Thus, in an embodiment, the record of processing passes comprises a particular number of (available) entries (slots) for storing the processing passes, with each entry in the record (slot) in the buffer storing a respective processing pass. For example, the record could comprise 32, 64 or 128 (available) processing pass entries (slots).

For each processing pass in the record, information indicative of any data that is required for performing the processing pass that is not yet stored in the cache, including an identifier for any data that is required for performing the processing pass that is not yet stored in the cache, is stored. Thus each record entry will store information indicative of any data that is required for performing the processing pass that the entry relates to that is not yet stored in the cache, including an identifier for any data that is required for performing the processing pass in question that is not yet stored in the cache.

The information indicative of any data that is required for performing a processing pass that is not yet stored in the cache can be organised and configured in the processing pass record in any suitable and desired manner.

It will at least include the identifiers for any data that is required for performing the processing pass that is not yet stored in the cache, and may only include the identifiers for any data that is required for performing the processing pass that is not yet stored in the cache. In this case, the identifiers themselves would alone act as the information indicative of any data that is required for performing the processing pass is not yet stored in the cache. This could be done, e.g., by maintaining a list of identifiers for data that is not yet stored in the cache for a processing pass, and then removing identifiers from the list as and when the data in question is loaded into the cache.

However, in an embodiment, an indication of any data that is required for performing the processing pass that is in addition to, and separate to and different from, the identifier(s) for any data that is required for performing the processing pass that is not yet stored in the cache, is also stored and maintained in the processing pass record for a processing pass.

In this case therefore, the information indicative of any data that is required for performing the processing pass that is not yet stored in the cache for a processing pass record entry will comprise both an indication of any data that is required for performing the processing pass that is not yet stored in the cache, and, separately, one or more identifiers for any data that is required for performing the processing pass that is not yet stored in the cache.

Thus, in an embodiment, each record entry will comprise and store both an indication of any data that is required for performing the processing pass that the entry relates to is not yet stored in the cache, together with, separately, a set of one or more identifiers for any data that is required for performing the processing pass that is not yet stored in the cache.

The identifiers for any data that is required for performing a processing pass that is not yet stored in the cache that are stored for processing passes in the "parking buffer" record can comprise any desired and suitable identifiers that can identify the "missing" data. For example, the identifiers could identify the individual data values and/or elements that are required (e.g. in terms of the memory location and/or data array position where the data value is stored or that the data element corresponds to).

In an embodiment, the identifiers identify the data that is required for performing a processing pass that is not yet stored in the cache in terms of the data "units" that will include the (individual) data values in question that will be loaded into the cache.

Thus, in an embodiment, the identifiers identify the data that is required for performing a processing pass that is not yet stored in the cache in terms of the identity of the cache line or lines that will contain that data when loaded into the cache (i.e. in correspondence with the data "units" that will be loaded into the cache).

Thus, in an embodiment, the identifiers for any data that is required for performing a processing pass that is stored in the entry in the processing pass record for the processing pass in question identify the cache line or lines that will contain that data in the cache.

The cache line or lines that will store the data that is required for performing the processing pass that is not yet stored in the cache can be identified in any suitable and desired manner. For example, the identifiers for the cache lines could comprise the identifiers that will be used to tag (identify) the data in the cache lines in the cache (i.e. some or all of the tags for the cache lines in question).

In an embodiment, the identifier(s) that identify the data that is required for performing a processing pass that is not yet stored in the cache that are stored in the processing pass record entry for a processing pass comprise the indices of the cache lines where the data that is not yet stored in the cache will be stored when it is loaded into the cache.

This will then facilitate simply comparing the index of a new cache line that is loaded into the cache (of a new line fill in the cache) with the corresponding identifiers for the processing passes, to identify any processing passes in the record that are waiting for the cache line in question.

For example, in the case where the cache has four lines, with corresponding cache line indexes 0-3, then if a processing pass needs the data from cache line 2 which is not yet stored in the cache, the cache index 2 will be stored in the processing pass record entry for the processing pass in question. Then, once the data for that cache line 2 has been loaded into the cache, cache line index 2 will be sent to the buffer management circuit and compared to the cache line index stored for the processing pass entry, to thereby identify that the data that the processing pass is waiting for has been loaded into the cache.

In this case, in an embodiment, when a processing pass is received to be processed, it will, as will be discussed further below, be determined whether all of the data values required for the processing pass are already present in the cache, and if not, the indices for the cache line(s) that have been allocated to receive the "missing" data values are in an embodiment then stored in the parking buffer processing pass record entry for the processing pass in question, as the identifiers for identifying the data that is required for performing the processing pass that is not yet stored in the cache.

It will be appreciated in this regard that the cache line(s) that are allocated to receive the "missing" data values may be cache line(s) that have already been allocated to receive the "missing" data values, but for which the data has not yet arrived from the memory (i.e. is not yet present in the cache line), and/or cache line(s) that are newly allocated to receive the data values in response to the determination of whether all the data values required for the processing pass are already present in the cache or not (thus the operation in an embodiment comprise allocating appropriate cache lines for receiving the "missing" data values, where such lines have not already been allocated).

Thus, in an embodiment, the indices for the cache line or lines that have been allocated to receive the "missing" data values (whether allocated in response to it being identified for the processing pass in question that the data values required for the processing pass are not already present in the cache, or having previously been allocated (e.g. in response to an earlier processing pass), but for which the data is not yet present in the cache (e.g. because it is on its way from the memory)), are stored in the parking buffer processing pass record entry for the processing pass in question, as the identifiers are identifying the data that is required for performing the processing pass that is not yet stored in the cache.

The processing pass record buffer and the processing pass record entries could be configured to be able to store the entire identifier (e.g. cache line index) for a data unit (cache line) that is required (and in one embodiment, that is the case). However, it would also be possible to organise the storage of the identifiers and the cache to reduce the size of the identifiers that need to be stored in the processing pass record entries, if desired (and in another embodiment, that is done).

For example, the cache could be divided into plural groups of cache lines, such as four groups of cache lines, with the requisite number of bits (e.g. two bits in the case of four groups) in the cache line index for a cache line identifying its group. The identifiers that are stored in the processing pass record entries could then be allocated in a particular, in an embodiment selected, in an embodiment predefined, order to the different cache line groups, thereby reducing the size of the identifiers (cache line indices) that need to be stored in the processing pass record entries (as the bits in the identifier identifying the cache line group would not need to be stored in the processing pass record entry, as that could be deduced instead from the position of the identifier in the set of identifiers for the processing pass entry instead).

For example, in the case of dividing the cache into four groups of cache lines, then for a processing pass record entry that can store eight identifiers (cache line indices), and by allocating particular identifier (positions) to particular cache line groups (e.g. identifiers 0 and 4 to cache line group 0, identifiers 1 and 5 to cache line group 1, and so on), the cache line group information can be deduced from the identifier position in the set of identifiers for the processing pass entry, thereby (in this case) saving two bits from each identifier (cache line index) that needs to be stored in the processing pass record entry.

Similar arrangements could be used for processing pass record entries that have capacity to store fewer than eight data unit identifiers (cache line indices), to again reduce the amount of data that needs to be stored for some or all of the identifiers for those processing pass entries.

Thus, in an embodiment, a particular, in an embodiment selected, in an embodiment predetermined, distribution of identifier positions in the processing pass record entry to groups of lines in the cache is used, to thereby allow some of the cache line identifier (in this case the cache line group information) to be deduced from the identifier's position in the set of identifiers for the processing pass record entry in question, such that not all of the complete identifier (in this case the information to identify the cache line group in question) may need to be stored in the processing pass record entry itself.

Other arrangements would, of course, be possible.

The (separate) indication of any data that is required for performing the processing pass that is not yet stored in the cache that is stored in addition to the identifier(s) can (where used) take any suitable and desired form.

It is in an embodiment in the form of an indicator such as and in an embodiment, a bit map, that has an entry for each respective data "unit" (e.g., and in an embodiment cache line) that the processing pass is waiting for, that can be set to indicate whether that data "unit" (that cache line) is present in the cache or not.

Correspondingly, the (separate) indication of any data that is required for performing a processing pass that is not yet stored in the cache in an embodiment has a respective entry for each different identifier that is stored for the processing pass for any data that is required for performing the processing pass that is not yet stored in the cache, which entry can be set to indicate whether the data that the identifier corresponds to is present in the cache or not.

In an embodiment it is in the form of an indicator, and in an embodiment a bitmap, having a respective entry for each different cache line that the processing pass needs and/or is waiting for, with each entry in the indicator (bit in the bitmap) then being set (or unset) appropriately to indicate whether the cache line the (bitmap) entry corresponds to is present in the cache or not.

This indication can then be used to keep track of whether and which data for the processing pass is present in the cache.

In an embodiment, and as will be discussed in more detail below, a given processing pass record entry will have a particular "identifier" capacity (i.e. be able to store a particular number of identifiers for missing data), and the (separate) indication of any data that is required for performing a processing pass that is not yet stored in the cache in an embodiment comprises an indicator, and in an embodiment a bitmap, with a respective entry for each different identifier that the processing pass record in question can store. The indicator (bitmap) entries can then be appropriately set to indicate which identifiers are still being waited for in the cache (and, as will be discussed further below, correspondingly updated when data units (e.g. cache lines) corresponding to the identifiers are loaded into the cache).

Thus, each entry in the processing pass record should, and in an embodiment does, include an appropriate set of fields storing identifiers (e.g. cache line indices) for any data that is required for performing the processing pass in question that is not yet stored in the cache (such as, and in an embodiment, the corresponding indices for any cache lines that the processing pass is waiting for), together with, separately, an indicator, e.g. bitmap, for indicating which of the identifiers stored for the processing pass are still being waited for (and which can be updated in use as data is loaded into the cache).

As discussed above, the Applicants have recognised that depending upon the nature of the processing pass, different processing passes may require different numbers of input data values in order to be performed. For example, a bilinear filtering pass require four different input data elements, whereas a trilinear filtering pass will require eight input data values. Correspondingly, when a processing pass is received to be performed, it may be that the cache will already store some but not all of the data values required for the processing pass (or none of them or all of them, in dependence upon what data is already present in the cache).

Thus the Applicants have recognised that processing passes may need to wait for none, only one, or plural data "units" (cache lines) to be loaded into the cache before they can be performed, and that this may, and probably will, differ from processing pass to processing pass.

It would be possible in this regard for each processing pass record entry to have the capacity to store up to the maximum number of identifiers for data units (cache lines) that may be required by a processing pass. For example, in the case of graphics texture mapping where the processing pass circuit is operable to perform up to trilinear interpolation (thereby requiring eight input data values), each processing pass record entry could be configured to have the capacity to store eight "missing" data identifiers (e.g. cache line indexes) (and in one embodiment, that is what is done).

However, the Applicants have recognised that providing capacity to store the maximum number of potentially missing data units (cache lines) for each processing pass in the record may potentially require a relatively large amount of storage to be set aside for the processing pass record, and, furthermore, that in many cases, a processing pass to be performed may only be "missing" (and therefore need to wait for) less than the maximum number of data units (cache lines) needed for a processing pass (e.g. because it may be quite likely that at least some of the data required for the processing pass will already be present in the cache, e.g. because it is also required for other, e.g., previous, processing passes, and/or it may be quite likely that at least some of the data required for the processing pass will be stored in the same cacheline (e.g. all the texels used by a 2×2 filtering operation may be stored in the same single cacheline (this may often be the case for a bilinear filtering operations, for example))).

The Applicants have accordingly recognised therefore that it may not be necessary to provide the capacity for each processing pass entry to store the maximum number of "missing" data identifiers that could be required.

Thus, in an embodiment, the buffer that stores the record of processing passes is configured and arranged such that different entries in the record have the capacity to store different numbers of identifiers for missing data for a processing pass. For example, and in an embodiment, the buffer may support entries that can store (that have the capacity to store) up to the maximum number of data units (e.g. cache lines) that may be required for a processing pass, together with other entries that can only store identifiers for up to some but not all of the maximum number of data units (cache lines) that may be missing for a processing pass, such as a half or a quarter of the maximum number of data units (e.g. cache lines) that could be missing.

In an embodiment, the buffer is organised such that it has plural different sets (categories) of record entries, with each set (category) of record entries being able to store up to a different maximum number of missing data unit (e.g. cache line) identifiers. In this case, there is in an embodiment a set of buffer units that can store two identifiers for missing data units (e.g. cache lines), together with one or more other sets of record entries that can store progressively increasing numbers of identifiers for missing data units (e.g. cache lines) (e.g., and in an embodiment, increasing by 2 each time, up to and including the maximum number of data units (cache lines) that could be missing from the cache for a processing pass).

For example, in the case where the processing pass circuit is configured to perform multilinear filtering passes up to and including trilinear interpolation, then in an embodiment there will be four different sets of processing pass entries supported by the buffer, one set that can store identifiers for up to two missing cache lines, one set that can store identifiers for up to four missing cache lines, one set that can store identifiers for up to six missing cache lines, and one set that can store identifiers for up to eight missing cache lines.

Other arrangements would, of course, be possible.

Configuring the entries in the processing pass record buffer in this way reduces the overall amount of storage capacity required for storing the buffer and the processing pass record. This then facilitates using more efficient storage for the identifiers for the missing data for the processing passes. For example, the Applicants have found that this "asymmetric" buffer entry configuration makes storing the identifiers for missing data units (e.g. cache line indexes) for processing passes in flip-flops affordable, which accordingly can save significant silicon area, and with virtually no performance impact, as compared, for example, to storing the identifiers for the missing data units in a RAM.

In these arrangements, the number and distribution of buffer entries in each "capacity" category in the overall processing pass record can be selected as desired, for example, and in an embodiment, in dependence upon an expected distribution of data unit "misses" in use.

In one embodiment, each "capacity" category in the overall processing pass record has the same number of buffer entries (i.e. there is an even distribution of different "capacity" category buffer entries in the overall processing pass record). In another embodiment, the distribution of buffer entries in each "capacity" category is biased towards either the higher or lower "capacity" categories, i.e. such that there are more lower "capacity" buffer entries than higher "capacity" buffer entries (or vice versa).

In addition to the information indicative of any data that is required for performing the processing pass that is not yet stored in the cache, the record entry for a processing pass may comprise and store any other suitable and desired information relating to the processing pass, e.g. that may be relevant to when and whether the processing pass is ready to be processed.

In an embodiment, each entry in the processing pass record has a corresponding record (entry) index, so as to allow the record entry in question to be identified (and thus a given processing pass will be assigned to a particular record index).

In an embodiment, each record entry in the record of processing passes includes and stores an indication of whether the record entry is in use for a processing pass or not. This indication can take any suitable and desired form, such as, for example, being in the form of a "valid" bit or flag, that can be set to indicate that the record entry is in use (i.e. stores a valid processing pass that is waiting to be processed).

The valid indicator may be appropriately set for a processing pass when that processing pass is added to the record. Correspondingly, the valid indicator may be appropriate unset (cleared) for a record entry when the processing pass corresponding to that record entry is output from the record for processing. The valid indicator can thus readily be used to determine whether or not the particular record entry is in use.

In an embodiment, each record entry in the processing pass record includes and stores, an indication of whether the processing pass in question is ready for processing (i.e. that all the data for the processing pass is present in the cache). Again, this "ready" indication can take any suitable and desired form, for example in the form of a "ready" bit or flag, that can be set to indicate when the processing pass is ready for processing. As will be discussed further below, this "ready" indication is in an embodiment set when and once it is determined that all the data needed for the processing pass is present (is stored) in the cache.

It should be noted in this regard, that this "ready" indication for a processing pass record entry is in an embodiment separate from, and in addition to, the indication of whether any data that is required for performing the pass is not yet stored in the cache.

Thus, in an embodiment, a processing pass entry in the processing pass record will store both a "ready" indication to indicate that the processing pass record entry is ready for processing (i.e. that all the data that is required for the processing pass is stored in the cache), a set of identifiers identifying any data that is required for the processing pass that is not yet stored in the cache, and an indication (e.g. a bitmap) corresponding to the set of identifiers, for indicating when the "missing" data corresponding to the identifier in question has been stored in the cache.

In an embodiment, the entries in the processing pass record also store information for indicating whether a processing pass is part of a sequence (chain) of associated processing passes that are to be performed together. In an embodiment, this information allows the position of a processing pass in the sequence of associated processing passes that it belongs to to be determined (indicates the position of a processing pass in the sequence of associated processing passes that it belongs to).

This "sequence" indicating information can take any suitable and desired form. In an embodiment, this information is provided by storing in each processing pass entry (for each processing pass in the record), a "next" processing pass indicator (pointer), that is used to indicate (point to) the next processing pass in the sequence in question. In this case therefore, a processing pass that is part of a sequence of associated processing passes will store a pointer to the next processing pass in the sequence.

The next indicator (pointer) can indicate (identify) the next processing pass in the sequence in any suitable and desired manner. It in an embodiment indicates (is a pointer to) the processing pass record entry that stores that next processing pass in the sequence, and in an embodiment indicates the index of the record entry for the next processing pass in the sequence.

In this case, in an embodiment, in the case where a processing pass is not part of a sequence of associated processing passes (or, looked at another way, the processing pass is part of a sequence of only one processing pass), then the "next" processing pass indication for the processing pass is set to point to itself (i.e. identifies the processing pass record entry for the processing pass itself). This then facilitates straightforwardly identifying "standalone" processing passes that are not part of a sequence of plural associated processing passes.

The next indicator (pointer) may be appropriately set for a given processing pass when that processing pass is added to the record, and/or when the next (or subsequent) processing pass in the sequence is added to the record.

In an embodiment, each processing pass entry is also able to store, and stores, an indication of whether the processing pass that the entry relates to is the last processing pass in a sequence of associated processing passes. This will then allow the end processing pass in a given sequence of associated processing passes to be identified. Again, this "end" processing pass indication can be provided in any suitable and desired manner. In an embodiment, it is in the form of an "end" or "tail" bit or flag, which can be set to indicate that the processing pass in question is the last processing pass in a sequence of processing passes.

In an embodiment, the "next" processing pass indicator for a processing pass that is the end processing pass of a sequence of processing passes (i.e. which has its end (tail) bit set) is set to point to the first processing pass in the sequence of associated processing passes in question. This then allows the head (the initial) processing pass in the sequence to be identified from and when the end (tail) processing pass in the sequence is reached.

Again, the "tail" indicator may be appropriately set for a processing pass when that processing pass is added to the record (and the "next" processing pass indicator (pointer) set to point to the head of the sequence when an end processing pass is added to the record).

In addition to the above information for indicating whether a processing pass is part of a sequence of associated processing passes, and the position of the processing pass in the sequence, in an embodiment, the entries in the processing pass record also store further information in order to facilitate the handling of sequences of associated processing passes, and in particular in order to facilitate the identification of sequences of processing passes that are ready to be processed.

The Applicants have recognised in this regard that where processing passes may be part of a sequence of associated processing passes, it may be desirable to starting processing the sequence of processing passes only once all the processing passes in the sequence are ready for processing (i.e. only once all the data for all the processing passes in the sequence of processing passes is present in the cache).)

This is because, e.g., starting to process processing passes from a sequence of associated processing passes before all the processing passes in the sequence are ready may result in a need to stall the performing of the processing passes in the sequence partway through the sequence if, for example, a processing pass in the sequence that is not yet ready is reached. The Applicants have recognised that this would be undesirable, as it may then lead to a need to stall the operation of the processing pass circuit until the processing pass in question is ready. Accordingly, the Applicants have recognised that it would be desirable to identify when all the processing passes in a sequence of associated processing passes stored in the processing pass record are ready.

To facilitate this, in an embodiment, each processing pass entry in the processing pass record can store and stores, an indication of whether the (entire) sequence of processing passes that the processing pass for the entry belongs to is ready or not. (This is in an embodiment in addition to, and separate from, the indicator that the processing pass per se is ready.)

Again, this indication could take any suitable and desired form, such as being in the form of a "sequence" (chain) "ready" bit or flag, that can be set when all the processing passes in the sequence of processing passes in question are ready for processing.

In an embodiment, only the "sequence ready" indication for the processing pass (the processing pass entry) that is at the head of the sequence (for the initial processing pass of the sequence) is set to indicate that the sequence of processing passes in question is ready. (Thus the "sequence ready" indicator will not be set for other processing passes in the sequence, even though the sequence of processing passes is ready to be performed.)

This then facilitates both identifying when a sequence of processing passes is ready to be performed, and the initial (the head) processing pass for the sequence (which head processing pass will then, as discussed above, point to the next processing pass in the sequence, and so on, until the identified end (tail) processing pass in the sequence is reached.)

In an embodiment, each entry in the processing pass record can, and in an embodiment does, also store an indication of whether the processing pass entry is the first processing pass entry in the sequence of processing passes that it belongs to (starting from the head (the initial) processing pass for the sequence) that is currently still waiting to be checked if it is "ready". This will then allow it to be determined which is the earliest processing pass (from the initial (head) processing pass in the sequence order) in a sequence of associated processing passes that is still waiting to be checked if it is ready. As will be discussed further below, this indication can be used to facilitate and make more efficient the identification of sequences of associated processing passes that are ready to be processed.

Again, this indication can be provided in any suitable and desired manner. In an embodiment it is in the form of a "needs scan" bit or flag, that can be set to indicate that the processing pass in question is the first processing pass in the sequence of associated processing passes that it belongs to that is still waiting to be checked if it is ready.

In an embodiment, only one processing pass (processing pass entry) in any given sequence of associated processing passes has this "needs scan" indication set at any one time.

The setting and use of these various indicators will be described in more detail below.

In an embodiment, in addition to the record of processing passes, a separate, "payload" record is maintained that stores the information needed in order to perform the respective processing passes.

Again, the payload record in an embodiment comprises a set of payload record entries, each storing a respective processing pass, and each, e.g., and in an embodiment, being respectively indexed within the payload record. The payload record in an embodiment has as many entries as the processing pass record, and there is in an embodiment one payload record entry for each processing pass that is in the processing pass record.

In an embodiment, the payload record index for a particular processing pass corresponds to (e.g. is derivable from or the same as) the record index for that particular processing pass in the processing pass record, such that the processing pass record index for a processing pass can also be used to identify the payload record entry for that processing pass (thereby to obtain the information needed in order to perform the processing pass from the payload record). The payload record may be stored in the same buffer or in a different buffer to the record of processing passes.

The "payload" information for a processing pass may take any suitable and desired form, and in an embodiment includes some or all, and in an embodiment all, of the information that is needed for the processing pass in question to be performed by the processing pass circuit.

In an embodiment, the payload record entry for a given processing pass indicates one or more of, and in an embodiment all of: the particular data and parameters that are to be used for the processing pass; and the particular type of operation that is to be performed for the processing pass.

The payload information for a given processing pass may duplicate (and correspond to) information that is recorded in the processing pass record entry for the processing pass in question, but it may also or instead, and in an embodiment does, include different and/or further information that is not recorded in the processing pass record entry for the processing pass in question.

For example, the payload record for a given processing pass should, and in an embodiment does store identifiers for all the data units (e.g. cache lines) that will store data that is required for performing the processing pass, whereas, as discussed below, the processing pass record entry for a given processing pass in the processing pass record may, and in an embodiment does, only store identifiers for the data that needs to be fetched into the cache when the processing pass is received.

It will be appreciated from the above that in operation of the technology described herein, processing passes will be received to be processed by the processing pass circuit, which processing passes will then be added to the processing pass record in the "parking" buffer in advance of being performed by the processing pass circuit. (The processing passes may be, as discussed above, "requested" directly, and/or may be generated in response to a request for a given data processing operation.)

In an embodiment, when a new processing pass is received for performing, it is first checked (e.g. prior to or as the processing pass is being added to the record) whether the data that is required for the processing pass is already stored in the cache or not. This can be done using any suitable and desired cache lookup operation, and in an embodiment checks whether the cache line or lines that will store the data are already (validly) present in the cache or not. Plural cache requests (lookups) may be made for the processing pass where input data that will be in plural different cache lines is required for the processing pass.

In an embodiment, this check is done by checking (the relevant entries of) a cache status map (e.g. bitmap) provided for cache (as discussed above), to determine whether the cache lines required for the processing pass contain valid data or not.

For any data that is needed for the processing pass that is found to be already present in the cache, then there will, accordingly, not be any need to make a request for that data to be fetched into the cache, but, e.g., and in an embodiment, appropriate metadata for the cache, such as a reference count for the cache line in question, is updated to indicate that there is a processing pass that needs the data in question (e.g. to avoid the data being evicted from the cache before the processing pass has used it).

Correspondingly, for any data that is required for the processing pass that is found to be not already stored in the cache (and, in an embodiment, that has not already been requested for fetching into the cache, e.g. in response to a previous processing pass), then in an embodiment the appropriate request(s) for that data to be fetched into the cache (e.g. from memory) is triggered and made. Depending upon what input data is not already stored in the cache (and any outstanding requests for the input data), this may comprise making plural requests for data to be fetched into the cache. (This process can be performed as desired, e.g., and in an embodiment, by allocating a line in the cache for the data, and then triggering a fetch of data into the allocated cache line.)

It should be noted in this regard, that this initial check of the cache when a processing pass is first received will be, and is in an embodiment, the only time that the cache is checked (tested) in respect of the processing pass. After this, the identification of whether data required for a processing pass is stored in the cache will be performed in the manner of the technology described herein, i.e. by testing new data that is loaded into the cache against the entries in the processing pass record to identify those entries that the new data applies to.

In the case of a processing pass for which the data required for that pass is not already stored in the cache, that processing pass should be, and is in an embodiment, correspondingly added to the record of processing passes to be performed by the processing pass circuit in the "parking" buffer.

It would be possible in this regard simply to store in the record those processing passes that are waiting for data that is to be fetched into the cache (for which data that is required for performing the processing pass is not yet stored in the cache when the processing pass is initially received).

However, in an embodiment, processing passes are added to and included in the record regardless of whether (it was determined that) the data that is required for the processing pass was already stored in the cache or not. In this regard, the Applicants have recognised that it can be efficient to store processing passes in the record regardless of whether or not the required data is already stored in the cache, since this can provide a single centralised record of all the processing passes that need to be performed.

Thus in an embodiment, all processing passes that are received for performing by the processing pass circuit are added to and stored in the record of processing passes, irrespective of whether or not the data required for the processing pass is already stored in the cache. Correspondingly, there may be one or more processing passes in the record for which the required data is already stored in the cache, and/or one or more processing passes for which all the required data is not yet stored in the cache.

Once the relevant cache lookups to determine whether the data required for the processing pass is already stored in the cache have been made (or otherwise), the processing pass will be allocated to and stored in an appropriate entry in the processing pass record. The data processor (and in an embodiment the buffer management circuit) in an embodiment comprises an appropriate allocator circuit configured to perform this operation.

The processing pass record entry to which a processing pass is allocated can be selected as desired.

A new processing pass should be allocated to an available processing pass entry (i.e. which is not already in use for another processing pass). The "valid" indicators for the processing pass entries are in an embodiment used to identify those processing pass record entries that are available to receive new processing passes. (In the event that there are no currently available processing pass record entries when a processing pass is received, then the new processing pass will need to be, and is in an embodiment, stalled until a processing pass record entry is available. As will be discussed further below, new processing pass record entries can be made available by outputting processing passes from the processing pass record.)

In an embodiment, a "valid" processing pass entry map (e.g. bitmap) is maintained to keep track of which entries in the processing pass record are available to receive new processing passes, that can then be used to identify which processing pass entries are free and which are in use when a new processing pass is received.

In the case where all the processing pass record entries have the same "identifier" capacity (e.g. are all able to store the maximum number of data unit (cache line) identifiers that may be required for a processing pass), then a new processing pass can simply be allocated to the next available entry in the processing pass record (e.g. on a round robin basis).

In the case where, as discussed above, the processing pass record entries are arranged as respective different groups of entries, having different "identifier" capacities, then the processing pass allocation process (and circuit) in an embodiment operates to, where possible, allocate a processing pass to an entry that is the "best fit" for the processing pass in question, i.e. that has the capacity to store the required number of identifiers for the "missing" data for the processing pass, but while minimising the difference between the number of "missing" data units (cache lines) for which identifiers that must be stored for the processing pass and the overall "identifier" capacity of the processing pass entry.

Thus, in an embodiment, the allocation of a processing pass to a processing pass record entry is based on the number of data units (cache lines) that were not already present in the cache (i.e. how many cache "misses" the processing pass had) when the processing pass was received. (This is possible because the processing pass record entries only need to store the identities of the data (cache lines) that is missing from the cache.)

This can be achieved in any suitable and desired manner. In an embodiment, any entries that do not have the capacity to store the number of missing data identifiers required for the processing pass (such that the processing pass should not be allocated to those entries) are ignored, and then a scan of the remaining processing pass record entries ordered by size is performed to find the (in an embodiment the first) smallest available entry in which to fit the processing pass (and which is big enough to fit the processing pass).

In an embodiment, any entries that do not have the capacity to store the number of missing data identifiers required for the processing pass are masked out, and then an MSB bit scan is performed with the processing pass record entries ordered by size (such that entry 0 is the last entry of the group that can hold the maximum number of identifiers, and "record size −1" is the first entry of the group of entries that has the minimum capacity (e.g. can hold only two identifiers)). This should then ensure that the smallest available entry in which to fit the processing pass is chosen as the entry to allocate the processing pass to.

Other arrangements would, of course, be possible.

Once an available processing pass record entry in the processing pass record has been allocated for a processing pass in question, the allocation process should, and in an embodiment does, set the information stored for that entry in the record accordingly.

Thus the allocation process will set the "valid" indicator for the (allocated) processing pass record entry to indicate that the entry is in use, and also set as appropriate, the "ready" indicator, the "needs scan" indicator, the "sequence ready" indicator, the "tail" indicator, and the "next processing pass" indicator (pointer) for the processing pass (where used), e.g. in dependence upon whether the processing pass is part of a sequence of associated processing passes and where in that sequence the processing pass lies.

In dependence upon the result of the cache lookups for the processing pass, the allocation process should, and in an embodiment does, also store in the processing pass record entry for the processing pass the identifiers of any data units (e.g. cache lines) that were missing from the cache (that are not already stored in the cache), and correspondingly, and where used, set the missing data indication (e.g. cache line bit map) appropriately, to indicate which data identifiers are still being waited for.

In an embodiment, only the identifiers for those data units (cache lines) that were missing from the cache are stored in the processing pass record entry (i.e. only the cache "misses" are tracked in the processing pass record (parking buffer)). (No identifiers for data units (cache lines) required by the processing pass that are already present in the cache are stored in the processing pass record entry.)

Thus, in the event that all the data required for the processing pass was already present in the cache, then in an embodiment, no data identifiers for the processing pass are stored in the processing pass record entry for the processing pass, and the processing pass entry allocation process instead simply sets the "ready" indicator for the processing pass entry to indicate that all of the data for the processing pass is present in the cache.

Thus, in an embodiment, in the case that it is determined that all the data required for the processing pass is already stored in the cache when the processing pass is received, the allocation process simply sets and stores for the processing pass, an indication that all the data that is required for the processing pass is stored in the cache (e.g., and in an embodiment, by setting a "ready" indicator for the processing pass entry in question).

In the case that the cache lookup determined that at least some data required for the processing pass was missing from the cache (was not already stored in the cache), then the allocation process will store the identifiers of any data units (e.g. cache lines) that were found to be missing from the cache (that are not already stored in the cache) in the appropriate identifier fields in the processing pass record entry, and correspondingly (where used) set the missing data unit indication (e.g. identifier bitmap) appropriately, to indicate which data unit identifiers are still being waited for. In this case, the "ready" indicator for the processing pass entry will not be set, as all the data for the processing pass is not yet present in the cache.

Thus, in the case where data required for a processing pass was not present in the cache (i.e. there was a cache miss), then that fact, and the identity of data that was "missing", is recorded for the processing pass.

Thus, in an embodiment, the method of the technology described herein comprises (and the data processor correspondingly comprises processing circuits configured to), when a new processing pass to be performed by the processing pass circuit is received, first determining whether the data required for the processing pass is already stored in the cache, and thereafter adding the processing pass to the record of processing passes stored in the buffer, including in the case where it is determined that not all of the data that is required for performing the processing pass is already stored in the cache, storing for the processing pass in the buffer an indication of any data that is required for performing the processing pass that is not yet stored in the cache.

As well as establishing the processing pass record entry for the processing pass in question, in an embodiment, the allocation process also allocates and sets up a payload record entry (as discussed above) for the processing pass.

The payload record entry for a processing pass in an embodiment store the identifiers (e.g. cache line indices) for all the data units (cache lines) that are required for the processing pass, irrespective of whether the relevant data units (cache lines) were found to already be present in the cache or not (as the processing pass circuit when performing the processing pass will need to know and be able to identify all the data that is required for the processing pass). (This is in contrast to the processing pass record entries, which, as discussed above, may only store the identifiers for those data units (cache lines) that were found to be missing from the cache.)

As well as storing new processing passes in the "parking" buffer record, in the technology described herein, when new data is loaded into the cache (i.e. there is a cache "line fill"), then at least for each processing pass that is recorded in the processing pass record and that is awaiting data to be stored in the cache, an identifier for the new data that has been loaded into the cache is compared to any identifiers for the processing pass for data that is required for performing the processing pass that is not yet stored in the cache. In other words, for each cache line fill, the identity of the data in question (e.g. the cache line index) is compared to the identifiers for the data that the processing pass entries are waiting for, to determine whether the new data (the new line fill) that was loaded into the cache is data that a processing pass entry was waiting for.

It would be possible in this regard only to test each processing pass in the processing pass record that is still awaiting data to be stored in the cache, but in an embodiment, the identifier for the new data that has been loaded into the cache is compared to any (stored) identifiers for data that is required for performing a processing pass for each processing pass (i.e. for all the processing passes) that is in the processing pass record.

Thus, in an embodiment, for each cache line fill, an identifier for that cache line fill is compared to the identifiers stored in the processing pass record for each and every processing pass that is in the processing pass record. This is in an embodiment done for each new data unit (e.g. cache line) that is loaded into the cache in a given cycle, such that if there is a single line fill per cycle, then that new line fill will be compared to the processing pass record entries, but if there are two line fills per cycle, then both those line fills will be compared to the processing pass record entries in the same cycle, and so on.

The processing pass record buffer management circuit thus in an embodiment comprises an appropriate identifier comparison circuit or circuits for this purpose. In an embodiment, each processing pass record entry has associated with it an appropriate comparison circuit (logic) that is operable to and configured to compare the identifiers stored in the processing pass entry with the identity of new data (a new line fill) that has been loaded into the cache.

The identifier for the new data that has been loaded into the cache that is compared to the processing pass identifiers recorded in the processing pass record should be, and is in an embodiment, an identifier that corresponds to the identifiers that are stored in the processing pass record. Thus, in the embodiment where the processing pass record entries store cache line indices as the identifiers of the data that they are waiting for, the line index for a new cache line that is loaded into the cache will be used as the identifier for the new data that has been loaded into the cache, and compared to the cache line indices stored for the processing passes in the processing pass record. In the case where other identifiers for the missing data are used, then again the corresponding identifiers should be compared to determine if they are the same or not.

The comparison process should, and in an embodiment does, operate to determine whether the new data that has been loaded into the cache is data that a processing pass was waiting for. This determination can be done in any suitable and desired manner, but in an embodiment, if the identifier for the new data that has been loaded into the cache (appropriately) matches an identifier for data that a processing pass is waiting for, then it is determined that the new data that has been loaded into the cache is data that the processing pass was waiting for. Correspondingly, if the identifier for the new data that has been loaded into the cache does not appropriately match any of the data identifiers for a processing pass record entry, then it is determined that the new data was not data that the processing pass in question was waiting for.

For any processing pass entry where it is determined that the new data that was loaded into the cache was not data that the processing pass in question was waiting for, then no further action is taken in respect of that processing pass entry, and the next new data to be loaded into the cache will simply be waited for.

On the other hand, where the identifier comparison for new data that has been loaded into the cache determines that the new data that was loaded into the cache is data that the processing pass was waiting for, then the information indicative of any data that is required for performing the processing pass that is not yet stored in the cache for the processing pass (entry) in question is updated appropriately (i.e. to indicate that that data in question is now present in the cache).

This updating can take any suitable and desired form, e.g. in dependence upon what form the information that is indicative of any data that is required for a processing pass that is not yet stored in the cache that is stored for each processing pass record entry takes.

For example, where the information indicative of any data that is required for a processing pass that is not yet stored in the cache simply comprises a list of identifiers for that data, the identifier corresponding to the new data that is now present in the cache could simply be deleted or invalidated.

In the embodiment where the information indicative of any data that is required for performing a processing pass that is not yet stored in the cache that is stored for a processing pass includes a (separate) indication of any data that is required for performing the processing pass that is not yet stored in the cache (e.g. an identifier, e.g. cache line, bitmap), then the updating operation in an embodiment comprises updating that indication accordingly, i.e. to indicate that the data unit (e.g. cache line) in question is now stored in the cache. Thus, in an embodiment, when the cache line fill in a cycle matches a cache line that a processing pass entry is waiting for, the corresponding cache line entry (e.g. bit) in the "waiting" data) indication (e.g. bitmap) will be updated accordingly (e.g. set) to indicate that that cache line is now present in the cache. This is again in an embodiment done by the comparison circuit that compares the identifiers.

In this way, the indication of any data that is required for performing the processing pass that is not yet stored in the cache will be updated for each entry in the processing pass record that the new data loaded into the cache applies to, as the data is loaded into the cache.

In an embodiment, the identifier comparison operation is also operable to and configured to identify and determine when all the data required by a processing pass is present in the cache, i.e. such that the processing pass is ready for processing, and to set the "ready" indicator for a processing pass record entry once all the data required for that processing pass is present in the cache.

Thus, in an embodiment, when a new data unit is loaded into the cache (there is a new line fill), and that is the final data unit (e.g. cache line) that a processing pass record entry is waiting for, the "ready" indicator for the processing pass entry is set to indicate that the processing pass entry is ready for processing (i.e. that all the data for the processing pass entry is present in the cache).

This updating operation can again be performed by any suitable and desired circuit of the processing pass record buffer management circuit. It is in an embodiment performed by the corresponding comparison circuit (logic) for the processing pass record entry in question.

While it would be possible simply to identify and indicate individual processing pass entries that are ready for processing (in the above manner), in an embodiment, sequences of associated processing passes that are ready for processing are also identified and indicated.

This can be done in any suitable and desired manner. In an embodiment, this is done by finding a processing pass in a sequence of associated processing passes that is indicated as being ready for processing and has its "needs scan" bit set (i.e. indicating that it is the first processing pass in the sequence order that is still to be checked if it is ready), and then progressively working along the sequence of processing passes in question (using the next pointers for the processing passes) until a processing pass in the sequence that is not yet ready, or the end processing pass in the sequence (and that is ready), is reached (and then looking for a new sequence of processing passes to check, and so on).

In an embodiment, this operation is performed by initially scanning the processing pass record (e.g. in a round robin fashion) to identify a processing pass that is ready for processing and has its "needs scan" bit set at the same time. If such a processing pass entry is found, then the "needs scan" bit is cleared and the "tail" indicator for the processing pass is checked to determine if the "tail" indicator is set for the processing pass.

If so (i.e. the processing pass is indicated as being the last processing pass in the sequence in question), then the process in an embodiment uses the next processing pass indicator (pointer) to reach the head of the sequence of processing passes in question, and sets the "sequence" ready indicator for that head processing pass to indicate that the sequence of processing passes in question is ready for processing.

On the other hand, if the "tail" indicator for the processing pass is not set (i.e. the processing pass is not the end processing pass in the sequence), then the process in an embodiment follows the next indicator (pointer) for the processing pass to identify the next processing pass in the sequence, and checks that processing pass next (in the next cycle), and so on.

If the sequence checking process reaches a processing pass entry in a sequence which is not yet indicated as being ready for processing, then it in an embodiment sets the "needs checking" bit for that processing pass entry, to indicate that that is the next processing pass entry in the sequence in question that is to be checked if it is ready (so it can be identified for checking in a subsequent scan).

This sequence "ready" checking process will thus, and in an embodiment, once it has identified a processing pass in a sequence that is ready and that is identified as needing checking, progressively work its way along the sequence to determine whether all the processing passes in the sequence are ready or not. This then facilitates identifying sequences of processing passes that are ready for processing in an efficient manner.

Once this sequence checking process identifies a sequence of processing passes that is ready for processing, or finds a processing pass in a sequence that is not yet ready, then the process in an embodiment stops checking that particular sequence, and instead resumes the more general (e.g. round robin) scan to identify another processing pass entry that is indicated as being ready for processing and as needing checking (i.e. that will be part of (e.g. another) sequence of processing passes that is in the processing pass record that is not yet ready for processing).

In this way, the process will identify sequences of processing passes that need checking, e.g. in a round robin manner, but once a sequence of processing passes that needs checking to determine if it is ready has been identified, the process will then progressively check that sequence of processing passes until it is either determined that the sequence is ready for processing, or there is a processing pass in the sequence that is not yet ready for processing. The process will then move on to trying to find a new sequence to check in the next cycle, and so on.

Thus, in an embodiment, the buffer management circuit further comprises an appropriate "sequence checking" circuit or circuits for checking sequences of processing passes to determine if they are ready (in this manner).

It would be possible in this regard simply to check a single sequence in each cycle, or it would be possible to check for (and) plural sequences of processing passes simultaneously.

Thus, there may be a single sequence checking circuit operable to check one processing pass entry in a sequence of processing passes in a cycle, or there may be multiple sequence checking circuits, each operable to check a processing pass entry in a sequence of processing passes in a given cycle (i.e. such that plural sequences of processing passes can be checked in parallel in a cycle of processing). Indeed, it is an advantage of the technology described herein that it can be scaled to facilitate checking for plural sequences of processing passes that are ready in parallel.

When a processing pass is ready (i.e. all the data that is required for the processing pass is stored in the cache), then the processing pass in question can be processed by the processing pass circuit.

Thus, in an embodiment, the technology described herein further comprises (and the buffer management circuit is further configured to) outputting processing passes from the processing pass record for performing by the processing pass circuit (and triggering the processing pass circuit to perform the processing pass in question). One or more processing passes may be output from the record during a given cycle of operation, e.g. in dependence upon how many processing passes the processing pass circuit can perform in parallel.

A processing pass to be output from the record for processing (in a cycle operation) may be selected in any desired and suitable way. As discussed above, the "output" selection process in an embodiment identifies and selects processing passes that are ready to be performed. For example, the processing pass output process (and circuit) may scan the processing passes in the record, e.g. in a round robin manner, e.g. from cycle to cycle, to identify (and then output accordingly), processing passes that are indicated as being ready to be performed.

While it would be possible simply to output processing passes from the processing pass record that are ready on an individual basis, in an embodiment sequences of associated processing passes that are ready for processing are identified, and then all the processing passes in the "ready" sequence are output for processing in turn (and in sequence) (starting from the "head" of the sequence), e.g. before starting to output the processing passes for a new sequence (and so on). This will then ensure that a given sequence of associated processing passes is outputted completely from the processing pass record in the proper order, e.g. before starting another sequence of processing passes.

It would also be possible to output two (or more) sequences in parallel, e.g. where the processing pass circuit(s) supports that (e.g. the parking buffer is coupled to, and can output data to, two (or more) pipelines (processing pass circuits)).

To do this, in an embodiment the processing pass record entries are scanned to identify sequences of processing passes that are ready for processing. This is in an embodiment done by scanning the processing pass record entries in a particular, in an embodiment selected, in an embodiment predetermined order (e.g. in a round robin fashion) looking for processing pass entries that have the "sequence ready" indication set (thereby identifying the head (initial) processing pass for a sequence that is ready for processing).

Once a "sequence ready" processing pass record entry is identified, then the process in an embodiment operates to output the identified head (initial) processing pass entry for the sequence in question, followed by the other processing pass entries in the sequence one after another and in order, until the end of the sequence (the "tail" processing pass for the sequence) is reached (and has been output for processing). This process can, and in an embodiment does, use the "next" processing pass indicators (pointers) and the "tail" indicator, set for the processing passes in the sequence, as discussed above.

This can then ensure that the processing passes in a sequence of associated processing passes are output for processing contiguously in order, e.g. one processing pass per cycle of operation.

Once all the processing passes in a given sequence have been output for processing, the initial scanning process is in an embodiment repeated to search for a next sequence of processing passes that is ready for outputting, and so on.

Thus the buffer management circuit will correspondingly comprise a processing pass sequence output circuit that is operable, in an embodiment in the above manner, to identify (and output) sequences of processing passes that are ready for processing.

In an embodiment, a "next" output processing pass indicator is stored and maintained in association with the processing pass record (e.g., and in an embodiment, by the buffer management circuit), that indicates and keeps track of the next processing pass to be output from the record.

This indicator can indicate the next processing pass to be output in any suitable and desired manner. It in an embodiment indicates the next processing pass record entry to be output, in an embodiment in terms of its index in the processing pass record. This indicator is in an embodiment correspondingly updated when a processing pass is output, e.g., and in an embodiment, based on the "next" and/or "tail" indicators for the processing passes.

When a processing pass is output from the processing pass record for processing, the processing pass record entry for that processing pass is in an embodiment correspondingly deleted, and/or the "valid" indicator for the processing pass entry in the processing pass record is in an embodiment unset (cleared), i.e. to indicate that the entry is now available for storing a new processing pass.

Correspondingly, the processing pass circuit will be triggered to perform the processing pass that is output. That operation can take any suitable and desired manner, e.g. in dependence upon the processing pass that is to be performed. In an embodiment, the relevant information in the payload cache is used by the processing pass circuit to determine how to and what to do, and the data required, etc., for the processing pass.

The operation of outputting a processing pass may further comprise loading the data required for that processing pass from the cache to the processing pass circuit. The data to load from the cache is in an embodiment identified using appropriate data identifiers (e.g. cache line indices) stored in the payload record entry for the processing pass in question (since the processing pass record entry for the processing pass may, as discussed above, not store identifiers for all the data that is required for the processing pass, e.g. in the case where some of that data was already present in the cache when the processing pass was added to the processing pass record).

The processing pass circuit should, and in an embodiment does, then perform the processing pass in question, e.g. and in an embodiment, to produce an appropriate result using the input data indicated for the processing pass.

The result produced by the processing pass circuit for a processing pass can be used as desired. For example, it may be combined with, or used to generate, one or more results generated by performing one or more other processing passes, e.g. in the same sequence of associated processing passes.

The result for a processing pass or sequence of associated processing passes may then be used as desired, e.g. stored in memory, and/or provided to the data processing element or circuit that requires that result.

The result may then be used by the requesting processing element as desired, e.g. when generating an appropriate output. The result may be provided in respect of one or more output data elements (e.g. that, in the case of graphics processing at least, correspond to one or more (pixel) sampling positions of an output array of data elements (e.g. of an image, e.g. to be displayed)).

As well as identifying and outputting "ready" sequences of processing passes (and processing passes) from the processing pass record in the above manner, the Applicants have recognised that there may be situations where the record of processing passes needs to be at least partially emptied or "drained", even if there are no sequences of processing passes in the record that are currently ready for processing. In particular, this would be desirable, and is in an embodiment done, where a new processing pass cannot be added to the record, for example, either because the record itself is full, or the cache is full such that no new cache lines for storing data needed by the new processing pass are available for allocating in the cache. This could arise, for example, where the record comprises a (e.g. very large) single sequence of associated processing passes, the end of which has not yet been reached.

In this case, the Applicants have recognised that it would be desirable to remove processing passes from the processing pass record, even if there are no sequences of processing passes in the record that are actually completely ready for processing, so as to at least partially empty or "drain" the processing pass record and/or cache, to free-up space in the processing pass record and/or cache for new processing passes and/or data, respectively.

Thus, in an embodiment, as well as the above operation (which will be the normal operation of the processing pass record), in which "ready" sequences of processing passes and/or processing passes are identified and output from the processing pass record, the buffer management circuit also supports, and can also operate in a different, "drain" mode to output processing passes, in which it will output processing passes from the record of processing passes irrespective of whether processing passes and sequences of processing passes are indicated as being "ready" for processing or not.

In this "drain" mode of operation, the processing passes can be output from the processing pass record by the buffer management circuit in any suitable and desired manner.

In an embodiment, the "drain" mode of operation still looks for and identifies the head of a sequence of associated processing passes in the buffer (the buffer management circuit could, e.g., keep track of all, or at least the most recently added, sequence "head" processing pass that is present in the processing pass record (in the buffer), so as to be able to identify the head of a sequence of associated processing passes in the buffer when and if the "drain" mode of operation is entered), but then outputs the processing passes in the identified sequence of processing passes (which may, as discussed above, be the only sequence in the buffer) in order and in turn, starting from the head of the sequence, irrespective of whether the sequence of processing passes is indicated as being "ready" or not. In this case therefore, the processing passes in the sequence will be output from the record one after another in turn, even though the sequence of processing passes is not indicated as being "ready".

In this case, where a processing pass in the sequence that is in fact not yet ready to be output from the record is reached, then outputting of the processing passes from the buffer should be, and is in an embodiment, appropriately stalled until the processing pass in question is ready (can be performed) (e.g. the relevant data is loaded into the cache).

Thus, in an embodiment, the buffer management circuit is operable to and configured to determine that the processing pass record needs to be drained of processing passes, and in response to determining that the record needs to be drained of processing passes, to switch to a (e.g. round robin) "drain" mode of operation in which the record is drained of processing passes.

In an embodiment, the buffer management circuit can correspondingly determine when the record no longer needs to be drained of processing passes and in response thereto switch back to operating in the manner of the technology described herein described above.

The determination that the "drain" mode needs to be used can be based on any suitable and desired criteria and conditions, such as, for example, one or more of, and in an embodiment all of: a determination that there is no end (tail) processing pass of a sequence of associated processing passes in the processing pass record, and/or (and in an embodiment together with) a determination that the processing pass record and/or the cache is full (or that there is less than a minimum threshold number of processing pass record entries or cache lines available for allocation). Other conditions and criteria could also or instead be used for this, if desired.

Correspondingly, it can be determined that a reversion to "normal" operation can be made on any suitable and desired basis, e.g. in response to determining that greater than a threshold number of processing pass entries and cache lines are available for use, and/or determining that an end (tail) processing pass of a sequence of associated processing passes has been output from the processing pass record. Again, other conditions and criteria could also or instead be used for this, if desired.

In an embodiment, even when operating in the "drain" mode, the process still operates to add new processing passes to the record (where it is possible to do that), and/or still continues to scan the record of processing passes to identify sequences of processing passes that are ready for processing.

As will be appreciated by those skilled in the art, although the technology described herein has been primarily described with reference to a single cycle of operation, the operation in the manner of the technology described herein may, and in an embodiment does, continue in substantially the same manner for plural successive cycles of operation, for example until all of the desired processing passes have been performed.

Depending upon the configuration of the processing pass record buffer and cache, etc., in a given cycle of operation, one or more requests (e.g. a single request) for a data processing operation/processing pass to be performed may be received, one or more processing passes (e.g. a single processing pass) may be added to the record of processing passes, one or more processing passes (e.g. a single processing pass) in the record may be scanned when identifying sequences of associated processing passes that are ready for processing, and/or one or more processing passes (e.g. a single processing pass) may be output from the record and performed.

Subject to the particular circuits, elements, etc., necessary for the operation in the manner of the technology described herein, the data processor can otherwise include any suitable and desired circuits, elements, units, stages, etc., that a data processor may comprise. Thus, in the case of a graphics processor, for example, the graphics processor in an embodiment comprises an appropriate rasteriser (rasterisation circuit) for rasterising primitives to fragments, a renderer (a rendering circuit), in an embodiment in the form of a fragment shader, for rendering fragments generated by the rasteriser, appropriate culling circuits, such as depth and stencil testers (testing circuits), a tile buffer in the case of a tile-based graphics processor, etc.

In some embodiments, the data, e.g. graphics, processor comprises, and/or is in communication with, one or more memories and/or memory devices that store the data described herein, and/or store software for performing the processes described herein. The data, e.g. graphics, processor may also be in communication with a host microprocessor, and/or with a display for displaying images based on the data generated by the data, e.g. graphics, processor.

In an embodiment, the data, e.g. graphics, processor is part of an overall data processing system that comprises one or more memories and/or memory devices and a host processor (and, optionally, a display). In an embodiment, the host microprocessor is operable to execute applications that require data, e.g. graphics, processing by the data, e.g. graphics, processor, with the data, e.g. graphics, processor operating when required to perform processing for applications executing on the host processor.

Other arrangements would, of course, be possible.

The technology described herein can be used for all forms of output that a data, e.g. graphics processor (and processing pipeline) may be used to generate, such as in the case of a graphics processor frames (images) for display, render to texture outputs, etc. The output data values from the processing are in an embodiment exported to external, e.g. main, memory, for storage and use, such as to a frame buffer for a display.

The technology described herein is applicable to any suitable form or configuration of data, e.g. graphics, processor and data processing system. In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a data processor causes said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of a graphics processor operable to execute graphics shader programs.

As discussed above, the technology described herein relates to the handling of plural processing passes, where the data to be used in those processing passes is to be cached. An embodiment of the technology described herein will now be described with reference to the fetching and use of texture data in a graphics processor.

When a computer graphics image is to be displayed, it is usually first defined as a series of primitives (polygons), which primitives are then divided (rasterised) into graphics fragments for graphics rendering in turn. During a graphics rendering operation, the renderer will modify the (e.g.) colour (red, green and blue, RGB) and transparency (alpha, a) data associated with each fragment so that the fragments can be, e.g., displayed correctly. Once the fragments have fully traversed the renderer, then their associated data values are stored in memory, ready for output, e.g. for display.

FIG. 1 shows schematically a graphics processor 100 that may be operated in accordance with the technology described herein.

FIG. 1 shows the main elements and pipeline stages of the graphics processor 100 that are relevant to the operation of the present embodiment. As will be appreciated by those skilled in the art there may be other elements of the graphics processor 100 that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor 100 as shown in FIG. 1 may be implemented as desired and will accordingly comprise, e.g., appropriate circuits and/or processing logic, etc., for performing the necessary operation and functions.

The graphics processor 100 shown in FIG. 1 is a tile-based processor. The graphics processor will thus produce tiles of a render output data array, such as an output frame, to be generated. The technology described herein is equally applicable to other systems, such as immediate mode rendering systems. The output data array may typically be an output frame intended for display on a display device, such as a screen or printer, but may also, for example, comprise a "render to texture" output of the graphics processor, etc.

FIG. 1 shows schematically the stages of the graphics processing pipeline that the graphics processor 100 executes after the graphics primitives (polygons) for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor.

As shown in FIG. 1, this part of the graphics processing pipeline includes a rasteriser 102 and a rendering stage (renderer) in the form of a fragment shading stage (fragment shader) 104. The graphics processor also includes and/or has access to (is in communication with) appropriate memory 106 for storing the data that the processor will use and/or generate, such as a depth and stencil buffer(s), tile buffers, a frame buffer 108, texture maps 110, etc.

The rasteriser 102 operates to rasterise the primitives making up the render output (e.g. the image to be displayed) into individual graphics fragments for processing. To do this, the rasteriser 102 receives graphics primitives to be rendered, rasterises the primitives to sampling points and generates graphics fragments having appropriate positions (representing appropriate sampling positions) for rendering the primitives.

Fragments generated by the rasteriser 102 are sent onwards to the fragment shading stage 104 (the renderer), as shown in FIG. 1. The fragments may be subjected to early culling tests, such as depth tests, before being sent to the fragment shader 104, if desired.

The fragment shading stage 104 performs the appropriate fragment processing (rendering) operations on the fragments it receives, so as to process the fragments to generate the appropriate rendered fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data.

In the present embodiment, the fragment shading stage 104 is in the form of a shader pipeline (a programmable fragment shader) implemented by an execution engine 112, but other arrangements, such as the use also or instead of fixed function fragment shading units would be possible, if desired.

The output fragment data values (the result colours) are written to appropriate tile buffers (not shown) that store an appropriate, e.g. colour, value for each sampling point that the buffers represent (in essence for each sampling point of the tile that is being processed). Once each tile has been processed, its data is exported from the tile buffers to a frame buffer 108 in a main memory 106 for storage, and the next tile is then processed, and so on, until sufficient tiles have been processed to generate the entire render output (e.g. frame (image) to be displayed).

The fragments may be subjected to any remaining operations necessary on the fragments, such as depth and stencil tests, blending with the framebuffer, dither, etc. (not shown), before being written to the tile and/or frame buffers, if desired.

Other arrangements for the graphics processor and graphics processing pipeline would, of course, be possible.

As shown in FIG. 1, as part of its operation the fragment shader 104 will use textures when shading the fragments it receives from the rasteriser 102, and as part of that texturing process will apply texture sample data (texels) using a texture mapper 114 of the graphics processor 100.

Figure 2:
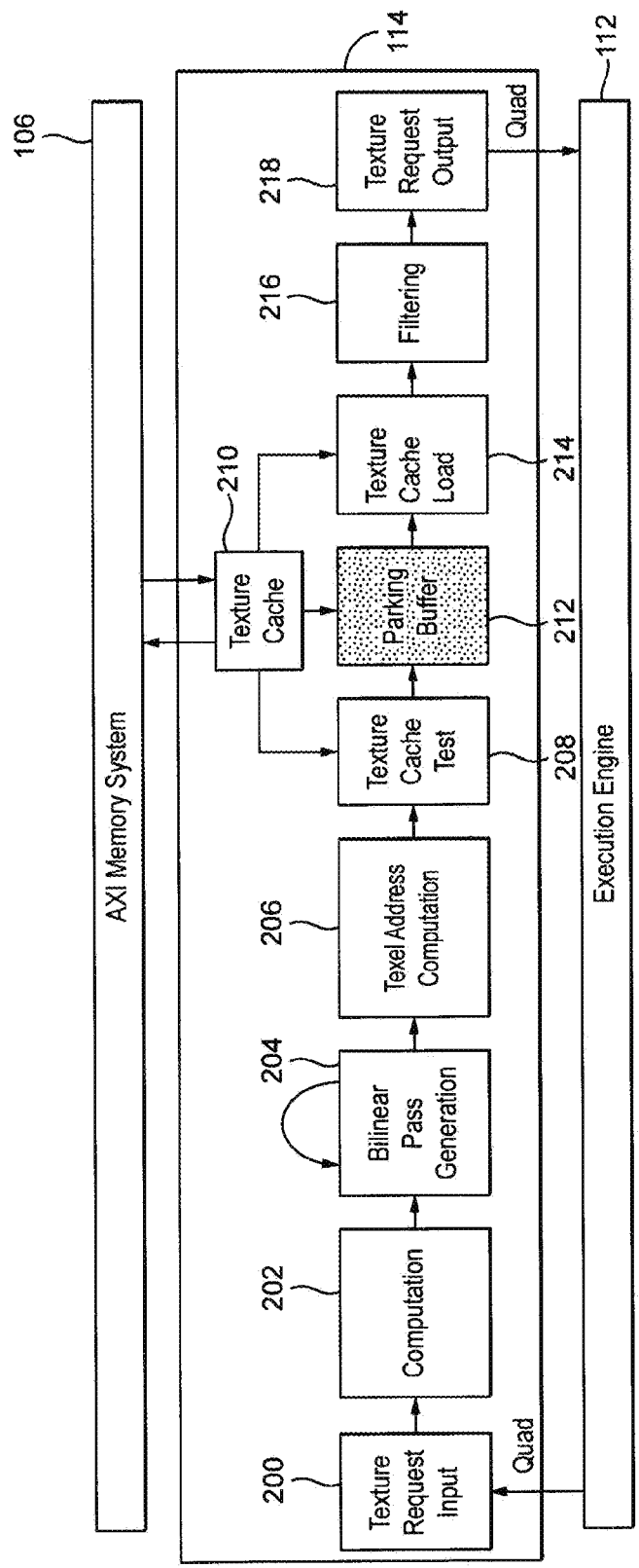
FIG. 2 shows schematically a texture mapper according to an embodiment of the technology described herein.

FIG. 2 shows the operation of the texture mapper 114 in more detail. Also shown are the memory 106 and execution engine 112. As is shown in FIG. 2, the texture mapper 114 comprises a texture request input stage (circuit) 200 that receives a texture request for a texture processing operation to be performed from the execution engine 112 through a GPU interconnect. In this embodiment, the texture request relates to a "quad" fragment for 2×2 sampling positions.

The texture mapper 114 then comprises a computation stage (circuit) 202 that decodes the texture request for the quad. The decoded texture request is then converted by a bilinear pass generation stage (circuit) 204 into a group (sequence or "chain") of one or more bilinear filtering passes. In this embodiment, the texture operation to be performed comprises bilinear filtering and so the texture operation for the quad will be formed of a group (sequence or "chain") of four bilinear filtering passes, with each bilinear filtering pass generating data for one of the sampling positions of the quad. In this embodiment, each bilinear filtering pass for a sampling position of the quad uses texture data for a 2×2 block of four texels.

Figure 3:
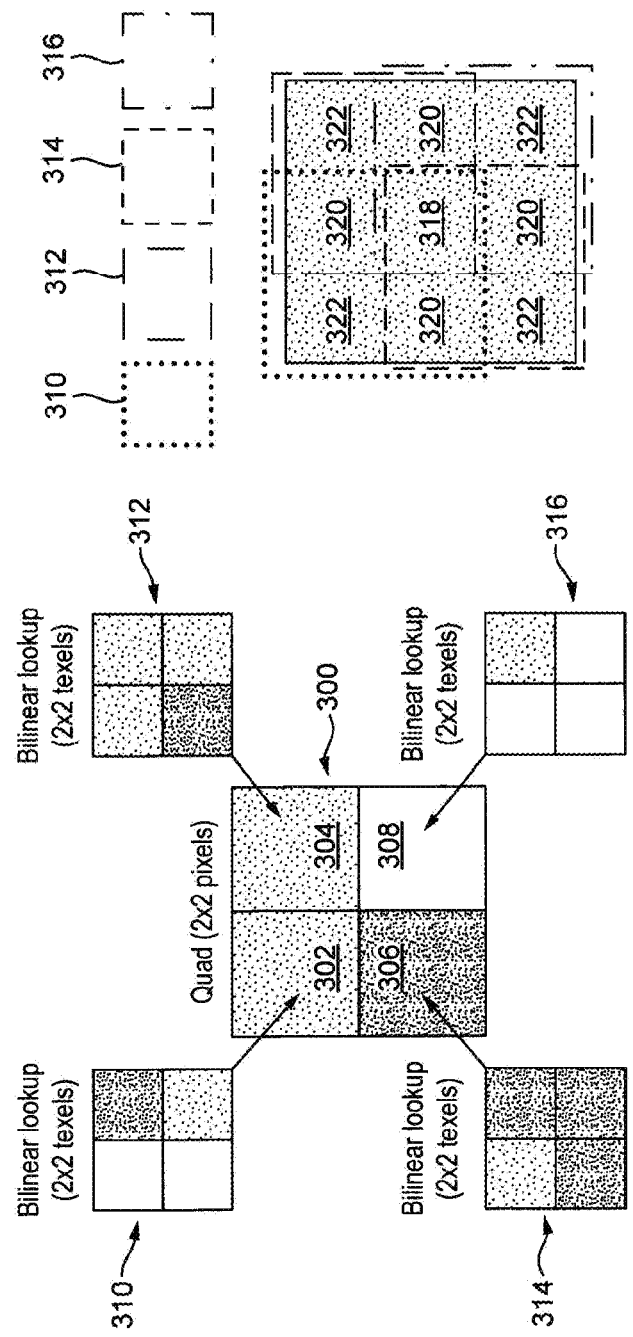
FIG. 3 illustrates a relationship between sampling positions and texels.

The relationship between the sampling positions of the quad and the texels of the texture in the present embodiment is shown in more detail in FIG. 3. As is shown in FIG. 3, a quad 300 relates to four sampling positions 302, 304, 306, 308. A first sampling position 302 of the quad will use a first 2×2 block of four texels 310, a second sampling position 304 of the quad will use a second 2×2 block of four texels 312, a third sampling position 306 of the quad will use a third 2×2 block of four texels 314, and a fourth sampling position 308 of the quad will use a fourth 2×2 block of four texels 316. Thus, in total, sixteen texels worth of data are needed.

However, FIG. 3 also shows how the blocks of texels overlap in the texture being applied. As is shown in FIG. 3, the central texel 318 of a 3×3 block of texels forms part of all four 2×2 blocks of texels, the four centre-edge texels 320 each form part of respective pairs of 2×2 blocks, and the four corner-edge texels 322 each form part of respective single 2×2 blocks. Thus, in this embodiment, for a quad of four sampling positions, with each sampling position using texture data from four texels, data is only required for nine unique texels (rather than sixteen unique texels). Since the processing passes for the quad share at least some texel data, it is desirable to try to handle those processing passes collectively as a group of related processing passes where possible. The technology described herein is particularly useful in this regard.

In the present embodiment, the texture operation to be performed comprises bilinear filtering. However, other higher order multilinear filtering may be performed in other embodiments. For example, trilinear filtering may be performed as two bilinear filtering passes for each sampling position of the quad, giving a group (sequence or "chain") of eight bilinear filtering passes for the quad. In these other embodiments, since the bilinear processing passes that form a trilinear filtering operation for a given sampling position are dependent on one another and must be performed in the correct order, it is desirable to try to handle those bilinear processing passes collectively as a group of related processing passes where possible. Again, the technology described herein is particularly useful in this regard.

Referring again to FIG. 2, the cache line (or location) addresses for the texels to be used in the bilinear filtering passes are then calculated by a texel address computation stage (circuit) 206. A texture cache test stage (circuit) 208 then determines whether or not the texture data for those texels is already stored in a local texture cache 210. For example, the required texture data may already have been fetched for a different bilinear filtering pass.

If the texture data to be used in a bilinear filtering pass is not already stored in the texture cache 210, and there is not an already outstanding request to fetch that data, then a request is made to fetch the required texture data into the texture cache 210 from the memory 106. A single cache request or plural cache requests (up to four cache requests in this embodiment) may be made for a given processing pass. If the texture data to be used in the bilinear filtering pass is already stored in the texture cache 210, then no such requests need to be made. (It should be noted here that there may be more than one level of cache, so more than one level of cache request may be needed, depending on the number of cache misses at different levels of cache.)

Regardless of whether or not the texture data to be used in the bilinear filtering pass is already stored in the cache 210, a record of the bilinear filtering pass is then added to a parking buffer 212. The operation of the parking buffer 212 is controlled using a buffer management circuit and will be described in more detail below.

In the present embodiment, a reference counter is also maintained in respect of each of the cache lines. In this regard, when a processing pass is added to the parking buffer 212, the reference counter for the relevant cache line is incremented. When a processing pass is later output from the parking buffer 212, the reference counter for the relevant cache line is decremented. This means that the reference counter for a particular cache line indicates the number of processing passes that are waiting to use the data in that cache line. A cache line is "locked" and cannot be reallocated to a different set of data when its reference counter is non-zero, i.e. when there are processing passes that are waiting to use the data in that cache line. However, a cache line is "unlocked" and can be reallocated to a different set of data when the reference counter for that cache line reaches zero, i.e. when there are no processing passes that are waiting to use the data in that cache line. This provides a convenient way to keep track of which cache lines are in use and which cache lines can be reallocated.

Figure 4:
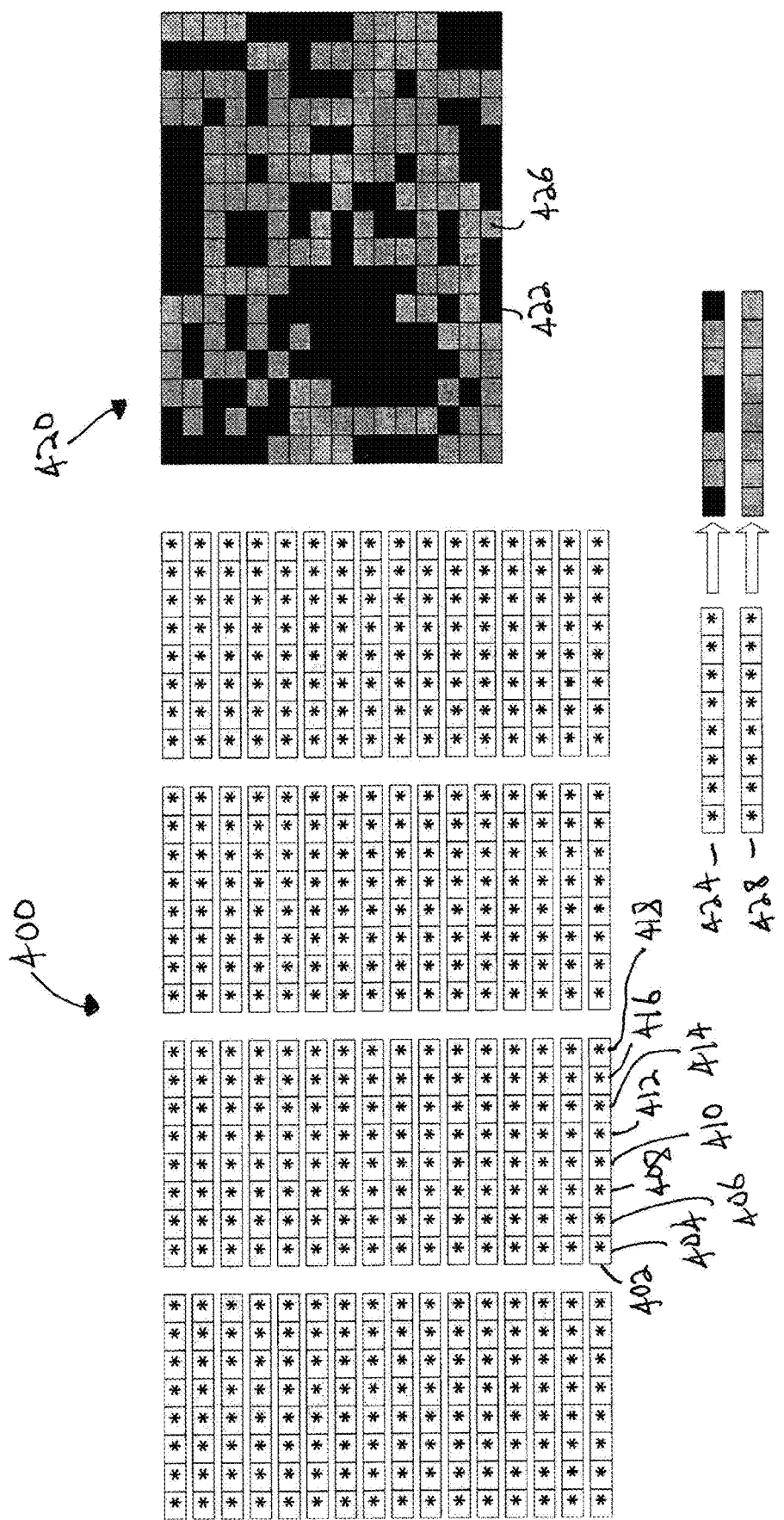
FIG. 4 shows cache line identifiers for plural graphics texture processing passes together with a bitmap indicating cache lines that contain valid data that may be used in embodiments of the technology described herein.

An example of a set of processing passes that can be recorded in the parking buffer 212 are shown in more detail in FIG. 4. As is shown in FIG. 4, in this embodiment, the parking buffer can store a set 400 of up to 64 processing passes 402, with each processing pass using up to eight different cache lines 404, 406, 408, 410, 412, 414, 416, 418 for its data. A given processing pass may use up to eight different cache line addresses for its cache requests or may use at least some cache line addresses that are the same.

FIG. 4 also shows a cache status bitmap 420 that shows which cache lines contain valid data. In this embodiment, there are 256 cache lines available for allocating to cache requests. In FIG. 4, an entry in the bitmap 420 that is darker indicates that the cache line (entry) does not contain valid data, whereas an entry in the bitmap 420 that is lighter indicates that the cache line does contain valid data. For example, the bit map entry 422 indicates that the corresponding cache line does not contain valid data, whereas the bit map entry 426 for another cache line indicates that that cache line does contain valid data. The cache line addresses 404, 406, 408, 410, 412, 414, 416 and 418, and cache status bitmap 420, can accordingly be used to determine when a processing pass is ready to be performed (when all the data needed for a processing pass is present in the cache texture cache 210).

FIG. 4 also illustrates, as an example, a first processing pass 424 for which four of its cache line addresses (indices) point to cache lines having valid data but four of its cache line addresses point to cache lines that do not have valid data. This first processing pass 424 accordingly is not ready to be performed. FIG. 4 also illustrates, as an example, another processing pass 428 for which all of its cache line addresses point to cache lines having valid data. This other processing pass 428 accordingly is ready to be performed. As will be discussed in more detail below, the operation of the parking buffer in the manner of the present embodiments provides an efficient way of determining which processing passes are ready to be performed.

Referring again to FIG. 2, when all of the texture data to be used in the bilinear filtering passes for the quad has been fetched into the texture cache 210, the bilinear filtering passes for the quad are output from the parking buffer 212 and the required data is loaded from the texture cache 210 by a texture cache load stage (circuit) 214. The bilinear filtering passes for the quad are then performed by a processing pass (filtering) stage (circuit) 216. The result of the filtering for the quad is then output by a texture request output stage (circuit) 218 through the GPU interconnect to the execution engine 112.

As will be appreciated, the above process will performed in respect of each quad for which a texture processing operation request is made and for each processing pass for each requested texture processing operation.

Figure 5:
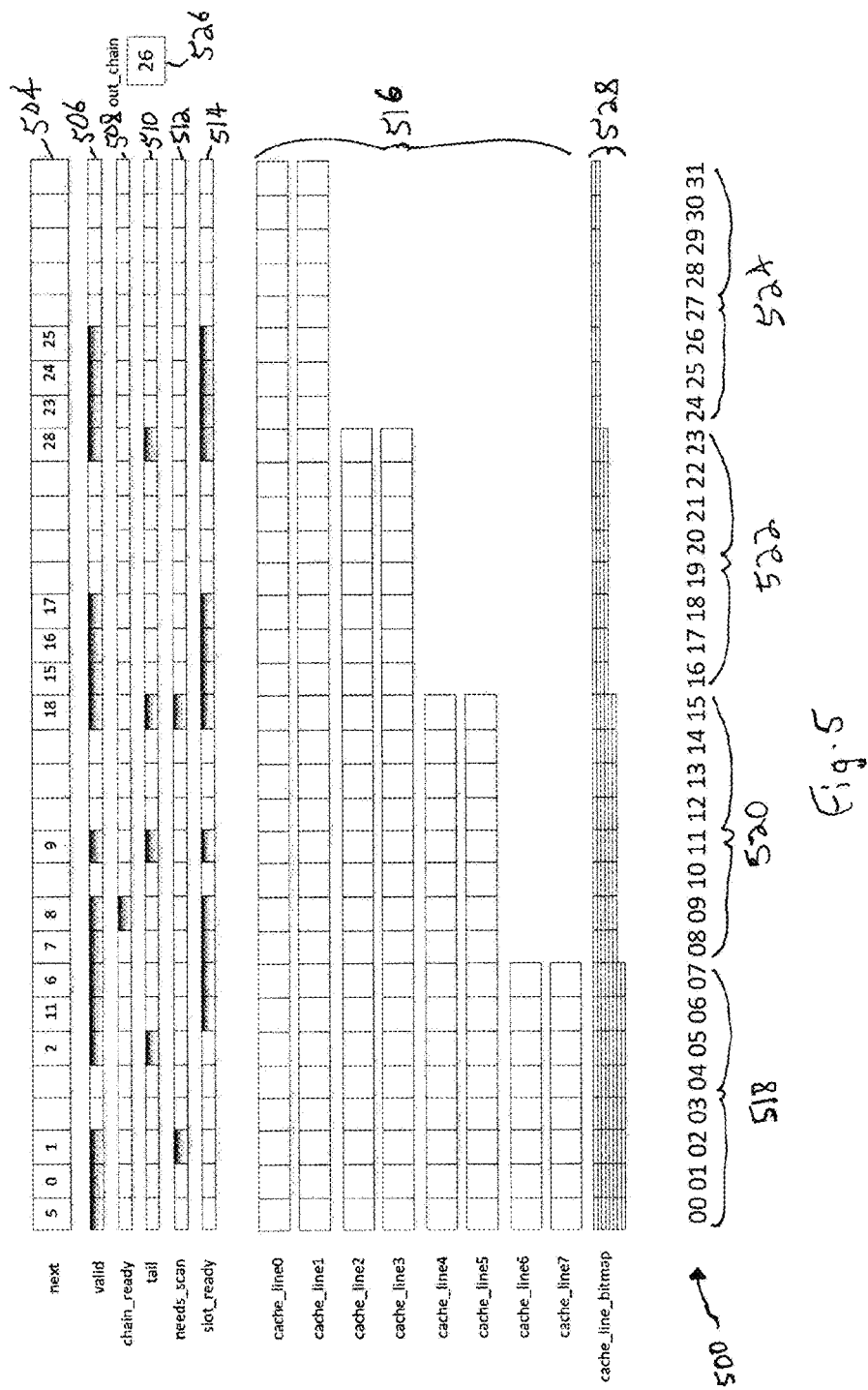
FIG. 5 shows a processing pass record according to an embodiment of the technology described herein.

FIG. 5 shows in more detail the content of the record of processing passes stored in the parking buffer 212 in the present embodiments. FIG. 5 shows an exemplary record of up to 32 processing passes. However, as discussed above, the parking buffer may be able to record more (or fewer) processing passes than this, such as 64 processing passes.

In this embodiment, the processing passes are referenced using 32 processing pass record indexes 500 (00 to 31).

In this embodiment, the record of processing passes comprises a "next indicator" 504 for each processing pass that points to the next processing pass in a group (sequence or "chain") of associated processing passes. In the case of the last or "tail" processing pass in a sequence of associated processing passes, the next indicator 504 will point back to the initial or "head" processing pass in the sequence. In the case of a group of just a single processing pass, the next indicator 504 will point back to that single processing pass itself.

The record of processing passes further comprises a "valid indicator" 506 for each processing pass that indicates whether or not that entry in the record is in use.

The record of processing passes further comprises a "chain ready indicator" 508 for each processing pass that indicates whether or not that processing pass is the initial or "head" processing pass of a sequence of associated processing passes that are all ready for processing.

The record of processing passes further comprises a "tail indicator" 510 for each processing pass that indicates whether or not that processing pass is the last or "tail" processing pass in a sequence of associated processing passes.

The record of processing passes further comprises a "needs scan indicator" 512 for each processing pass that indicates whether or not that processing pass still needs to be considered or ("scanned") during a cycle of operation.

The record of further processing passes further comprises a "slot ready" indicator 514 for each processing pass that indicates whether that processing pass is ready for processing (i.e. that all the data needed for the processing pass is stored in the cache). This "slot ready" indicator 514 is in addition to, and separate to the "chain ready" indicator 508 that indicates when a sequence of associated processing passes is ready for processing.

As discussed above, in this embodiment, each processing pass uses up to eight cache lines for the data required when performing that processing pass. Each processing pass record entry therefore also comprises capacity (fields) to store identifiers (in this embodiment the cache line index) for any cache lines that the processing pass is still waiting for (i.e. for any data that was not present in the cache when the processing pass was received for processing).

While it would be possible in this regard simply to allow each processing pass record entry to have the capacity to store up to the maximum number of (in this case eight) cache line indices for the data required when performing a processing pass, as shown in FIG. 5, in the present embodiments different entries in the processing pass record are configured to be able to store different (maximum) numbers of cache line indices.

In particular, as shown in FIG. 5, there is a first group of record entries 518 that can store up to eight cache line indices, a second group of record entries 520 that can store up to six cache line indices, a third group of record entries 522 that can store up to four cache indices, and a fourth group of record entries 524 that can store up to two cache line indices.

The Applicants have recognised in this regard that while each processing pass may require up to eight different cache lines, it is likely to be the case that for many processing passes when received, at least some of the cache lines required for the processing pass will already be (validly) present in the texture cache 210.

Furthermore, and as will be discussed further below, in operation of the present embodiments, there is no need to store in the processing pass record the identity of cache lines that are already (validly) present in the texture cache 210 for a processing pass, such that the processing pass record in the parking buffer 212 only needs to store identifiers for those cache lines that the processing pass is waiting for.

This being the case, there may therefore, typically, be many processing passes that are added to the parking buffer that are waiting for fewer than the maximum number of possible cache lines, such that fewer than the maximum number of cache line indices need to be stored for the processing pass in the parking buffer. This then reduces the overall storage requirement for the cache line identifiers in the parking buffer 212.

Having some processing pass record entries in the parking buffer that only have the capacity to store reduced numbers of cache line identifiers, reduces the overall storage size of the parking buffer 212, thereby, for example, allowing the missing cache identifiers for each processing pass in the buffer to be stored in more efficient storage, such as flip-flops, rather than having to be stored in RAM. By providing an appropriate distribution of different cache identifier "capacity" entries in the processing pass record in the parking buffer 212, an appropriate set of entries for storing processing passes as needed can thus be provided in a more efficient manner.

The relative distribution of different "capacity" processing pass record entries in the parking buffer can be set and selected as desired. For example, this may be based on the expected distribution of cache "misses" for processing passes in the graphics processing system in question.

As will be discussed in more detail below, in this arrangement of the present embodiments, when a processing pass is to be added to the processing pass record in the parking buffer 212, an appropriate entry in the buffer that can store the identifiers of the "missing" cache lines for the processing pass in question is selected based on the identifier "capacities" of the available parking buffer processing pass record entries.

As shown in FIG. 5, each processing pass record entry, as well as having capacity to store a set of identifiers (in this embodiment, cache line indices) for any cache lines that a processing pass is still waiting for, also includes and stores a separate indication 528 of those "identifiers" (i.e. cache lines) that the processing pass is still waiting for. This separate indication 528, as shown in FIG. 5, which in the present embodiments is in the form of a bitmap, includes an entry (a bit) for each respective different cache line that the processing pass record entry has the capacity to store an identifier for, that can be set (or unset) appropriately to indicate whether the cache line having that identifier (index) is present in the cache or not.

This indication can then be used to keep track of whether and which data for the processing pass is present in the cache, and which data the processing pass is still waiting for.

A payload record (not shown) is also kept for the processing passes. The payload record provides the information (metadata) needed when performing the processing passes. The information for a particular processing pass can be obtained from the payload record using the record index for that particular processing pass.

In the example shown in FIG. 5, there are four sequences (groups) of associated processing passes stored in the record. These sequences of associated processing passes will now be discussed in more detail.

The processing passes of a first sequence of associated processing passes are respectively referenced by record indexes 00, 01, 02 and 05. The processing pass referenced at record index 02 is the initial or "head" processing pass in the first sequence. The record for processing pass 02 then indicates that the processing pass referenced at record index 01 is the next processing pass in the first sequence. The record for processing pass 01 then indicates that the processing pass referenced at record index 00 is the next processing pass in the first sequence. The record for processing pass 00 then indicates that the processing pass referenced at record index 05 is the next processing pass in the first sequence. The record for processing pass 05 then indicates that the processing pass referenced at record index 02 is the next processing pass in the first sequence. However, the tail indicator 510 for processing pass 05 also indicates that processing pass 05 is the last or "tail" processing pass in the first sequence. Thus, it can be concluded that processing pass 02 is the initial or "head" processing pass in the first sequence.

As is also shown in FIG. 5, none of the slot ready indicators 514 for the processing passes of the first sequence are set. This is because each processing pass is still waiting for at least one cache line to be fetched into the cache. Thus, it can readily be determined from the slot ready indicators 514 that the processing passes of the first sequence of processing passes are not ready to be output from the buffer. Correspondingly, the "needs scan" indicator is set for the initial ("head") processing pass 02 of the sequence, to indicate that the sequence checking process (which will be discussed in more detail below) still needs to check this processing pass in the first sequence to see if it is ready or not.

The processing passes of a second sequence of associated processing passes are respectively referenced by record indexes 06, 07, 08, 09 and 11. The processing pass referenced at record index 09 is the initial or "head" processing pass in the second sequence. The record for processing pass 09 then indicates that the processing pass referenced at record index 08 is the next processing pass in the second sequence. The record for processing pass 08 then indicates that the processing pass referenced at record index 07 is the next processing pass in the second sequence. The record for processing pass 07 then indicates that the processing pass referenced at record index 06 is the next processing pass in the second sequence. The record for processing pass 06 then indicates that the processing pass referenced at record index 11 is the next processing pass in the second sequence. The record for processing pass 11 then indicates that the processing pass referenced at record index 09 is the next processing pass in the second sequence. However, the tail indicator 510 for processing pass 11 indicates that processing pass 11 is the last or "tail" processing pass in the second sequence. Thus, it can be concluded that processing pass 09 is the initial or "head" processing pass in the second sequence.

In the case of the second sequence of associated processing passes, it can be seen that the slot ready indicators 514 for all the processing passes in the sequence are set, thereby indicating that each processing pass in the sequence is ready for processing. The "chain ready" indicator for the head processing pass 09 in the sequence is correspondingly also set, thereby indicating (and allowing it to be determined from this chain ready indicator 508) that all of the data for the processing passes of the second sequence of associated processing passes has been fetched into the cache, and that the processing passes of the second sequence of processing passes are accordingly ready to be output from the record.

The processing passes of a third sequence of associated processing passes are respectively referenced by record indexes 15, 16, 17, 18. The processing pass referenced at record index 18 is the initial or "head" processing pass in the third sequence. The record for processing pass 18 then indicates that the processing pass referenced at record index 17 is the next processing pass in the third sequence. The record for processing pass 17 then indicates that the processing pass referenced at record index 16 is the next processing pass in the third sequence. The record for processing pass 16 then indicates that the processing pass referenced at record index 15 is the next processing pass in the third sequence. The record for processing pass 15 then indicates that the processing pass referenced at record index 18 is the next processing pass in the third sequence. However, the tail indicator 510 for processing pass 15 indicates that processing pass 15 is the last or "tail" processing pass in the third sequence. Thus, it can be concluded that processing pass 18 is the initial or "head" processing pass in the third sequence.

In the case of this third sequence of associated processing passes, again the "slot ready" indicators for all the processing passes in the sequence are set, to indicate that all the data needed for all the processing passes in the sequence is present in the texture cache.

However, in the case of this third sequence of associated processing passes, the "needs scan" indicator is set for the last or "tail" processing pass 15 of the sequence. This indicates that the sequence checking process (which will be discussed in more detail below) still needs to check this processing pass in the third sequence to see if it is ready or not. Correspondingly, unlike in the case of the second sequence of processing passes discussed above, in this case the "chain ready" indicator for the head processing pass 18 in this third sequence of processing passes has not yet been set to indicate that the sequence of processing passes is ready for outputting (even though all the processing passes are in fact "ready"), because the last or "tail" processing pass 15 in the sequence has not yet been checked (which, as discussed above, is indicated by the setting of the "needs scan" indicator for that processing pass 15).

FIG. 5 also shows an exemplary fourth sequence of associated processing passes that is in the process of being output from the parking buffer 212. In this case, it is assumed that this fourth sequence of associated processing passes comprises the processing passes respectively referenced by record indexes 23, 24, 25, 26, and 28, with the processing pass referenced at record index 28 being the initial or "head" processing pass in the fourth sequence. FIG. 5 shows the situation where that "head" processing pass 28 has already been output from the record, As is indicated by an "out chain" indicator 526, the processing pass referenced at record index 26 is the next processing pass in the fourth sequence to be output, and thus should be the next processing pass to be output. The record for processing pass 26 then indicates that the processing pass referenced at record index 25 is the next processing pass in the fourth sequence, and thus should be the next processing pass to be output. The record for processing pass 25 then indicates that the processing pass referenced at record index 24 is the next processing pass in the fourth sequence, and thus should be the next processing pass to be output. The record for processing pass 24 then indicates that the processing pass referenced at record index 23 is the next processing pass in the fourth sequence, and thus should be the next processing pass to be output.

The record for processing pass 23 then indicates that the processing pass referenced at record index 28 is the next processing pass in the fourth sequence. However, the tail indicator 510 for processing pass 23 indicates that processing pass 23 is the last or "tail" processing pass in the fourth sequence. Thus it can be concluded that processing pass 23 is the last processing pass in the fourth sequence, and so once that processing pass has been output, the outputting of the fourth sequence of associated processing passes has been completed (and correspondingly a new sequence of processing passes can be output).

It will also be seen from FIG. 5 that the "slot ready" indicators are set for the processing passes in the fourth sequence of associated processing passes (as that sequence of processing passes is ready for output, and so all the individual processing passes in it must correspondingly be ready for output). However, there is not a "chain ready" indicator set for any of the (still to be output) processing passes in the fourth sequence, because the initial or "head" processing pass 28 in the fourth sequence for which that "chain ready" indicator would have been set, has already been output, as discussed above.

Figure 6:
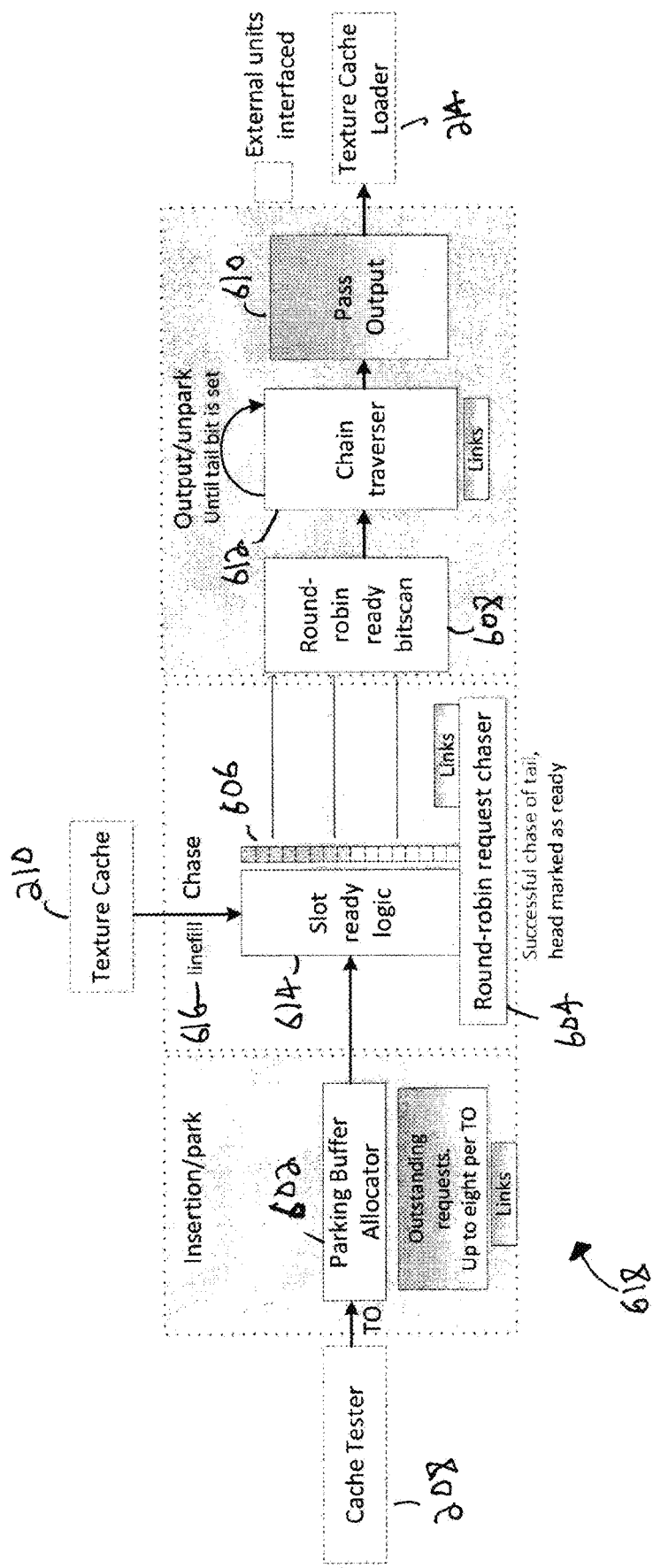
FIG. 6 shows a buffer management circuit according to an embodiment of the technology described herein.

FIG. 6 shows an overview of managing the record of processing passes stored in the parking buffer 212 using a buffer management circuit (which comprises plural different elements (circuits), as will be described below).

In the present embodiments, as discussed above, in a given cycle of operation, a texture cache test stage (circuit) 208 receives a processing pass and tests whether or not the texture data required for that processing pass is already stored in the texture cache 210. As discussed above, if the required data is not stored in the texture cache 210, a request is made to fetch that data into the texture cache 210.

As discussed above, in the case of bilinear filtering, since each processing pass can require four texels of data, there can be up to four outstanding cache requests for a given bilinear filtering processing pass. Correspondingly, in the case of trilinear filtering, since each processing pass can require eight texels of data, there can be up to eight outstanding cache requests for a given trilinear filtering processing pass.

It should be noted here that the outstanding cache requests are managed separately from the record of processing passes and may, for example, be managed in a conventional manner.

The processing pass is then stored in the parking buffer by a parking buffer allocator circuit 602. The operation of the parking buffer allocator 602 will be discussed in more detail below.

In the same cycle of operation, a sequence (chain) "chaser" circuit 604 selects a processing pass from the parking buffer to be considered (that has its "needs scan" indicator set). In this embodiment, the selected processing pass for "chasing" may be an initial or "head" processing pass in a sequence ("chain") of plural associated processing passes, or may be the next processing pass to be considered in a sequence ("chain") of plural processing passes that is currently under consideration.

As discussed above, the next processing pass in a sequence to be considered may be indicated in the record by an index stored in association with the previous processing pass in the sequence.

Again, the operation of the sequence chaser 604 will be discussed in more detail below.

In the same cycle of operation, a sequence ready output scanner circuit 608 may identify from the record 606 an initial or "head" processing pass of a sequence of associated processing passes that is ready to be performed (that has its "chain ready" indicator set). Again, the operation of the sequence ready output scanner 608 will be discussed in more detail below.

Sequences of associated processing passes that are "chain ready" are provided to a chain traverser circuit 612 for outputting (e.g. one after another). The chain traverser 612 provides, in respective cycles of operation, each of the processing passes in a "ready" sequence, starting with the initial ("head") processing pass, in turn, to a pass output stage (circuit) 610, which then outputs those processing passes to the texture cache loader (circuit) 214.

As discussed above, the next processing pass in a sequence to be output may be indicated by an out chain indicator 522. This allows a sequence of associated processing passes to be output and performed contiguously in the correct order once the data required for the whole sequence is stored in the cache.

The texture cache loader 214 loads the data required for each output processing pass from the texture cache 210 so that that processing passes can then be performed.

As shown in FIG. 6, the parking buffer management operation (and circuit) also includes an identifier comparison circuit (and process) 614, that is operable to compare identifiers for new cache lines that are loaded into the texture cache 210 (for new cache line fills) to the identifiers for cache lines that the processing passes parked in the parking buffer are waiting for, to identify processing passes that were waiting for the newly loaded data.

To do this, as shown in FIG. 6, the identity (in the present embodiments, the cache line index) for any (and each) line fill in the texture cache 210 is provided 616 to the identifier comparison circuit 614.

The identifier comparison circuit 614 comprises a small logic circuit for each processing pass record entry in the parking buffer that is operable to compare the identifiers (the indices) for cache lines stored in the processing pass record entry with the identifier (cache line indices) of incoming line fills in the texture cache 214.

The comparison logic circuit for a parking buffer entry compares all of the stored line indices for the parking buffer entry against a and each incoming cache line fill.

The operation of the identifier comparison circuit 614 will be described in more detail below.

The parking buffer allocator 602, sequence chaser 604, sequence ready output scanner 608, chain traverser 612, pass output circuit 610, and identifier comparison circuit 614 together constitute the buffer management circuit 618 of the present embodiments.

The above process is repeated in each cycle of operation, with the parking buffer allocator 602 adding a new processing pass to the record, the sequence (chain) chaser 604 checking a new processing pass (either in a new sequence or the next processing pass in the current sequence), and the sequence ready output scanner 608 and/or chain traverser 612 outputting a new processing pass that is ready to be performed.

Figure 7:
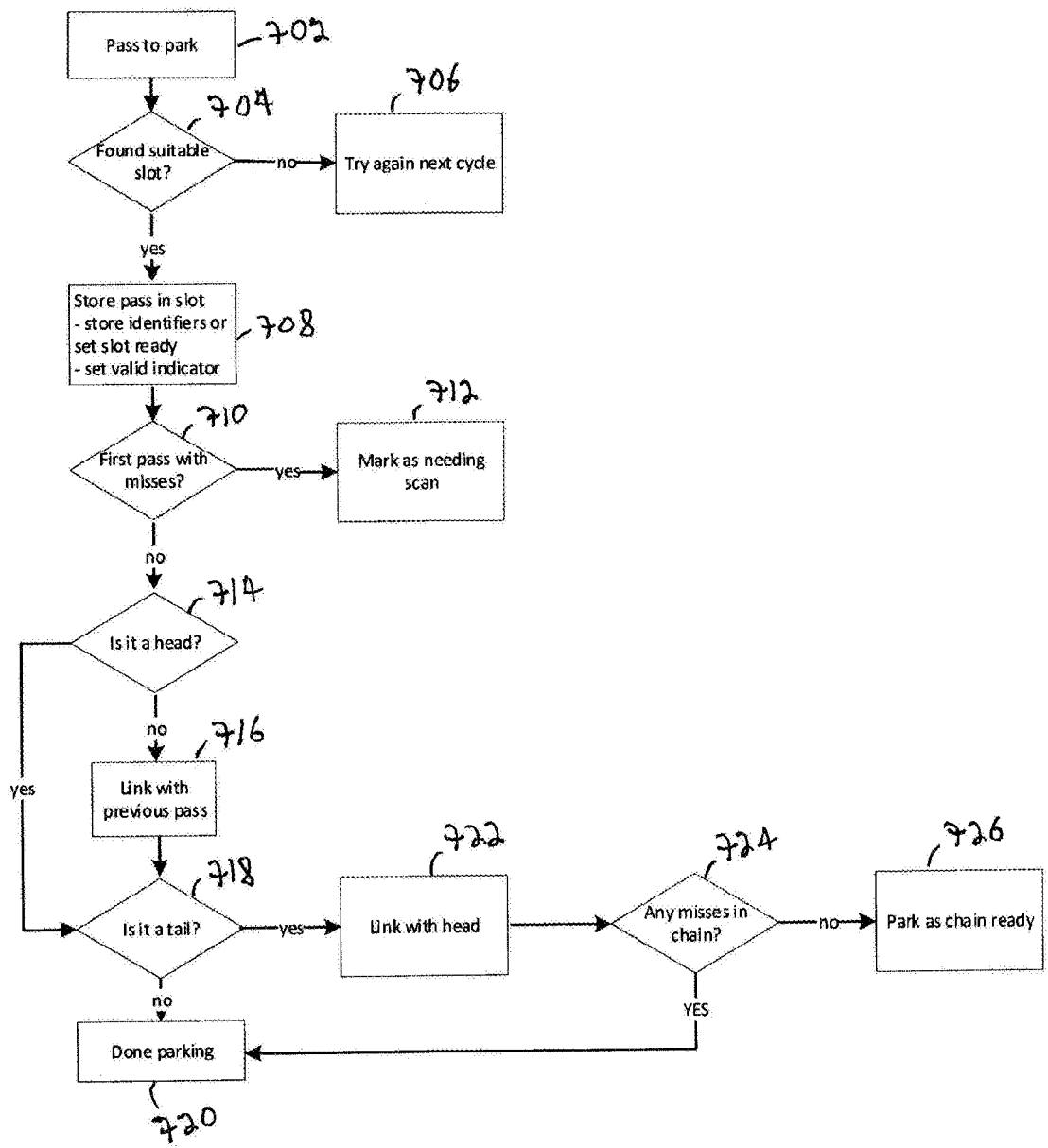
FIG. 7 shows the adding of a processing pass to a record of processing passes stored in the buffer in an embodiment of the technology described herein.

FIG. 7 shows in more detail the adding ("parking") of a texture processing pass to the parking buffer 212 as performed by the parking buffer allocator 602 of FIG. 6 during one cycle of operation in the present embodiments.

At step 702 the parking of a processing pass begins.

The first part of the parking process is to identify a suitable entry (slot) in the parking buffer for storing the new processing pass.

In the present embodiments, because, as discussed above, different entries (slots) in the parking buffer have different "identifier" capacities, the number of cache line misses for the processing pass in question determined by the cache tester 208 (when testing whether and what data required for the processing pass is already present in the texture cache 210), is used to select the parking buffer entry that is used to store the new processing pass.

To do this, any available parking buffer entries (i.e that do not have their valid indicator set) that do not have the capacity to store all the identifiers required for the cache lines that were found to be "missing" for the new processing pass are masked out, and then an MSB bitscan, with the parking buffer entries ordered by size (with entry "0" being the last entry of the group of entries that can hold the maximum number of identifiers (which will be eight identifiers in the present embodiments), and "parking buffer size −1" being the first entry in the group of entries having the minimum capacity for cache line identifiers (which will be two identifiers in the present embodiments) (where "parking buffer size" is the total number of entries in the parking buffer)), is performed to find the (available) entry to store the processing pass in.

This will then have the effect of always selecting for a new processing pass to be parked, the parking buffer entry that has the capacity to hold the required cache line identifiers for the missing cache lines for the processing pass, while minimising the difference between the number of "missing" cache line identifiers to be stored, and the overall capacity for storing cache line identifiers that the processing pass entry has capacity for.

Other arrangements for selecting a processing pass entry for a processing pass could, of course, be used.

If at step 704 a suitable processing pass record entry (slot) for the new processing pass cannot be found (e.g. there is not an available processing pass record entry with the required identifier capacity), then the process waits and tries to find a suitable entry in the next cycle (step 706).

On the other hand if an appropriate processing pass record entry is available, then the new processing pass will be stored in that entry (step 708).

To do this, as shown in FIG. 7, if any data for the processing pass was found to be missing from the texture cache by the cache tester 208, the parking buffer allocator 602 stores in the selected processing pass record entry the identifiers for the cache lines for the processing pass that were found by the cache tester 208 to be missing from the texture cache 210 (i.e. the identifiers for any data for the processing pass that was found not to already be stored in the texture cache). In the present embodiments, as discussed above, these identifiers are stored in the form of cache line indices for any cache lines that the processing pass is (still) waiting for.

The allocator will also correspondingly set the "line bitmap" to indicate which identifiers (cache line indices) the processing pass is waiting for.

In the present embodiments only those cache lines that were found to be missing by the cache tester 208 are stored in the parking buffer entry for the processing pass. Thus the parking buffer only stores the cache line identifiers that were "misses".

On the other hand, where the cache tester 208 found that all data required for the processing pass was already stored in the texture cache 210, then the parking buffer allocator 602, rather than storing any identifiers for missing cache lines in the selected processing pass record entry, will instead simply set the "slot ready" indicator for the processing pass record entry, to indicate that the processing pass is ready for processing (i.e. that all the data required for the processing pass is stored in the texture cache).

As show in FIG. 7, the parking buffer allocator 602 will also set the "valid" indicator for the processing pass record entry, to indicate that that entry (slot) is in use.

The parking buffer allocator 602 then determines whether the processing pass is the first processing pass in the sequence of associated processing passes that the processing pass belongs to (in order from the head of the sequence) for which all the data is not yet already stored in the texture cache 210 (step 710). If so, the "needs scan" indicator for the processing pass is set (step 712).

In either case, it is then determined, at step 714, whether the processing pass is the initial or "head" processing pass in a sequence ("chain") of one or more associated processing passes.

If the processing pass is not the initial ("head") processing pass, then in step 716 the processing pass is linked with the previous pass in the sequence (i.e. the record index for the current processing pass under consideration is provided in the "next indicator" for the previous processing pass in the sequence). In this regard, the record index for the previous processing pass may be temporarily tracked from the previous parking cycle to allow the previous processing pass to be identified in the current parking cycle, so that the next indicator for that previous processing pass can be suitably modified. (If the processing pass is the initial ("head") processing pass then there is no need to perform step 716.)

In either case, the record index for the current processing pass under consideration is provided in the next indicator for the current processing pass, such that the current processing pass is made to point to itself for the time being.

It is then determined at step 718 if the processing pass is the end ("tail") processing pass in the sequence.

If the processing pass is not the end ("tail") processing pass in the group, then the parking process finishes at step 720. In this case, the next indicator for the current processing pass may be made to point to the next processing pass in the sequence during a subsequent parking cycle. Again, the record index for the current processing pass may be temporarily tracked to allow the current processing pass to be identified in a subsequent parking cycle, so that the next indicator for the current processing pass can be suitably modified.

If the processing pass is the end ("tail") processing pass in the sequence, then at step 722 the processing pass is marked as such and is linked with the initial ("head") processing pass in the sequence (i.e. the record index for the initial ("head") processing pass is provided in the "next indicator" for the current processing pass under consideration). In this regard, the record index for the head processing pass in the group may be temporarily tracked from one or more previous parking cycles to allow this to happen. As will be appreciated, where the sequence comprises only one processing pass, the processing pass may remain linked to itself.

Then in step 724, it is determined whether all the data required for the sequence of processing passes as a whole is stored in the cache. If there are no cache misses for the sequence of processing passes then in step 726 the sequence of processing passes is marked as ready to be performed (i.e. the initial ("head") processing pass in the sequence has its "chain" ready indicator set). If there are cache misses for the sequence of processing passes, the parking process is simply finished (step 720).

Figure 8:
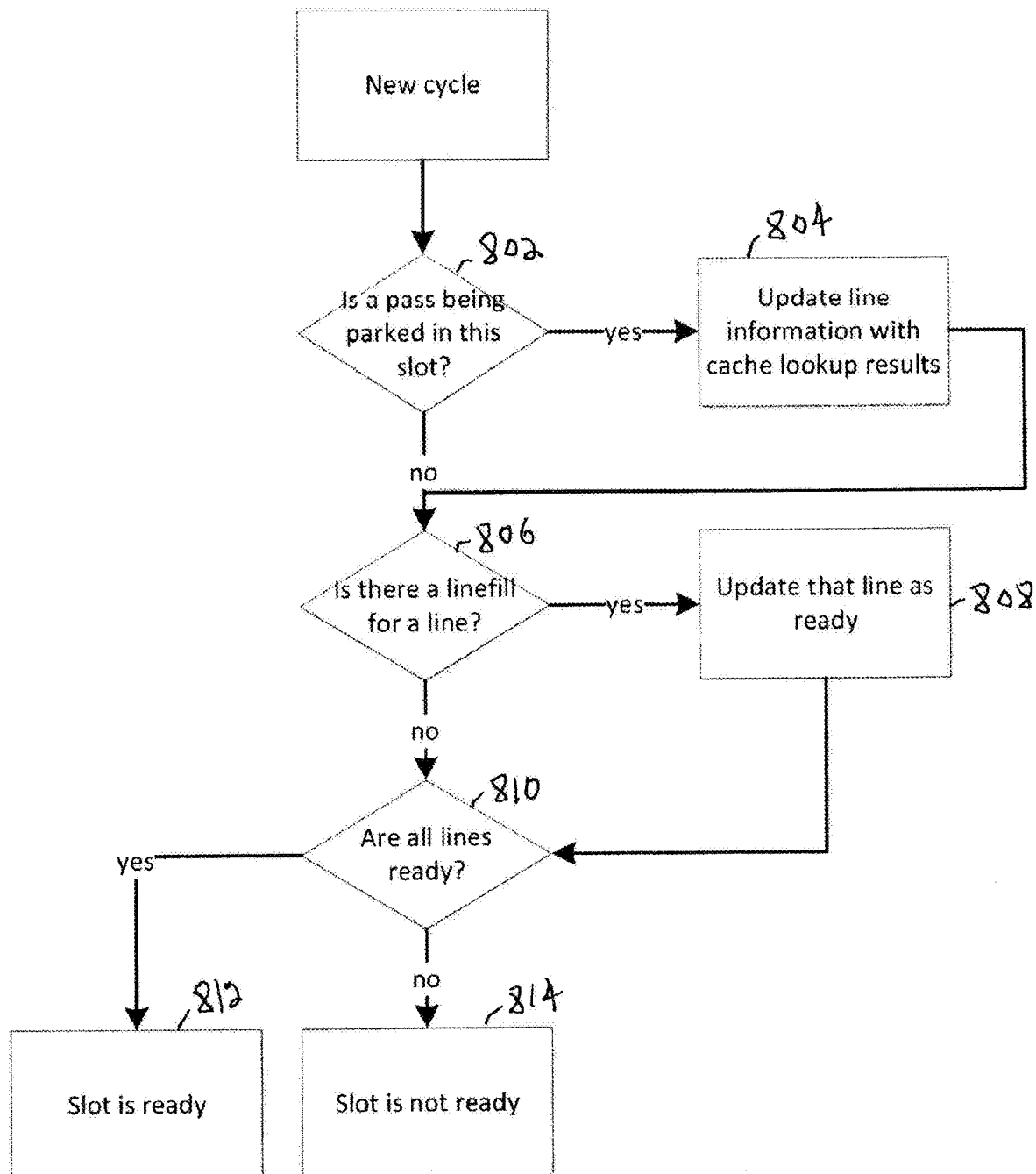
FIG. 8 shows the checking and updating of cache lines being waited for in an embodiment of the technology described herein.

FIG. 8 shows the operation of the identifier comparison circuit 614 of the buffer management circuit 618 in more detail.

FIG. 8 shows the operation in each cycle of operation by the comparison logic circuit for a respective processing pass record entry in the parking buffer. Thus the operation shown in FIG. 8 is respectively performed for each processing pass record entry, in each cycle of operation.

As shown in FIG. 8, for the processing pass record entry in question, it is first determined whether a new processing pass is being parked in the entry in the current cycle of operation (step 802). If so, the identifiers for any cache lines that the processing pass is still waiting for (as determined by the cache tester 208), and the waiting cache line indication (bitmap), are set and stored appropriately for the processing pass record entry in question (step 804).

In either case, it is then determined whether there has been a new cache line loaded into the cache that is a cache line that the processing pass record entry is waiting for (step 806). As discussed above, this is done by providing the identity (the cache line index) for any (and each) line fill in the texture cache in a given cycle of operation to the comparison logic circuits for the parking buffer entries, such that the comparison logic circuit for each parking buffer entry then compares all of the line indices stored for the parking buffer entry against the incoming cache line fill.

As shown in FIG. 8, if the identifier for the new line fill matches the identifier for a cache line that the processing pass record entry is waiting for (i.e. the line fill is for a line that the processing pas in question is waiting for), then the identifier comparison circuit operates to update the cache line bitmap for the processing pass record entry in question to indicate that the cache line in question is now present in the cache (step 808). Thus, if the index of an incoming line fill matches an index stored for a processing pass record entry, then the cache line bitmap indicating the data that the processing pass in question is waiting for is updated accordingly. (The corresponding bit in the cache line bitmap could, e.g., be masked out when that line arrives in the cache, such that when every bit in the bitmap is 0, the processing pass entry is no longer waiting for any data to be loaded into the cache (or vice-versa). Other arrangements would of course be possible.)

In either case, it is also determined whether all the cache lines that the processing pass entry is waiting for are now stored in the cache (step 810). If so, the "slot ready"

indicator is set for the processing pass record entry (step 812). Otherwise, the slot ready indicator for the processing pass record entry is left unset, to indicate that that entry is not yet ready for processing (step 814).

In this way, in every cycle, any new cache line fill is compared against the waiting cache lines for all the processing passes in the parking buffer, thereby allowing "ready" instructions to be immediately detected as soon as the final cache line that they are waiting for is loaded into the cache.

Figure 9:
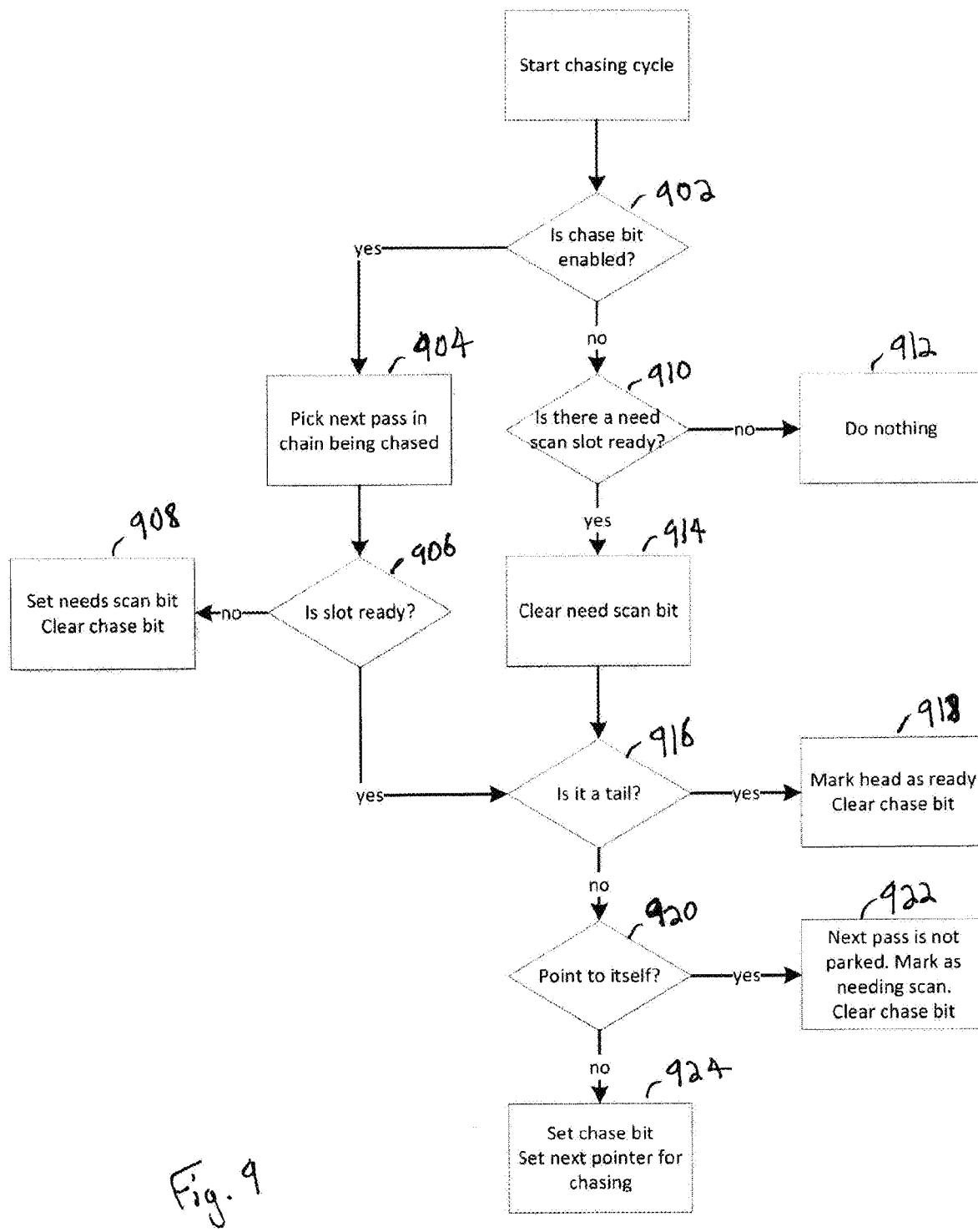
FIG. 9 shows the identifying of sequences of processing passes that are ready for processing in an embodiment of the technology described herein.

FIG. 9 shows the operation of the sequence chaser 604 of the buffer management circuit 618 in more detail. Again, FIG. 9 shows the operation of the sequence chaser 604 in a given cycle of operation.

As discussed above, the sequence chaser 604 operates to identify sequences of associated processing passes in the parking buffer that are ready for processing.

As shown in FIG. 9, the "chasing" operation starts by determining whether a "chase" bit that is used to indicate whether a sequence of associated plural processing passes is currently being considered ("chased") is enabled or not (step 902).

If a sequence of plural associated processing passes is currently being considered, then the next processing pass in that group is selected (step 904) and it is determined whether that processing pass is indicated as being ready for processing (i.e. has its "slot ready" indicator set) (step 906). If the next processing pass in the sequence currently being "chased" is found not to be ready, then the "needs scan" indicator for that processing pass is set, and the "chase" bit is cleared, to thereby trigger the sequence chaser 604 to look for a new sequence of associated processing passes to consider ("to chase") (step 906) (so that a processing pass from a different sequence of processing passes can be considered in the next cycle).

If the "chase bit" is not enabled at step 902, i.e. the sequence chaser circuit 604 is not currently considering a sequence of associated processing passes, then the sequence chaser circuit 604 scans, in the present embodiments in a round robin fashion, the processing pass entries in the record to see if there is a processing pass entry in the parking buffer that has both its "slot ready" indicator set, and the "needs scan" indicator set (step 910).

In the present embodiments, the chaser 604 scans all the entries in a single cycle. This is done by ANDing a bitmap of the "slot ready" status of the parking buffer entries with a bitmap of the "needs scan" status of the parking buffer entries, to give a bitmap with the candidates to be chased (ready and needing scan). Then two copies of the AND result are put side by side to make a bitmap double the size. Then, all bits from 0 up to and including the previously chosen entry are masked out and the first enabled bit thereafter is chosen. This gives a round robin scanner (e.g., if the previously chosen entry was the highest order one, then the process effectively scans the second copy of the AND result as the first copy is completely masked out).

If there isn't a processing pass record entry that is both "slot ready" and has its "needs scan" indicator set, then the "chaser" operation finishes for the cycle (step 912) (and the sequence chaser 604 will again to look for a processing pass record entry that is ready for processing and has its "needs scan" indicator set in the next cycle).

On the other hand, if the scanning process finds a processing pass record entry that is indicated as being "slot ready" and has its "needs scan" indicator set, then the "needs scan" indicator for the processing pass entry will be cleared (step 914).

In either case, where the processing pass entry that was being checked was indicated as being ready for processing (has its "slot ready" indicator set), it is then determined whether the processing pass is the last ("tail") processing pass in the sequence of associated processing passes that it belongs to (step 916).

If the processing pass is the last ("tail") processing pass in the sequence of processing passes, then the "chain ready" indicator for the initial ("head") processing pass in the sequence of processing passes is set to indicate that the entire sequence of processing passes is ready for processing (step 918). Also, the chase bit is cleared so that a processing pass from a different sequence of processing passes can be considered in the next cycle.

If the processing pass is not the last ("tail") processing pass in the sequence of processing passes, then it is determined whether the processing pass points to itself (step 920). If the processing pass does point to itself, then it can be concluded that the subsequent pass in the sequence of processing passes has not yet been parked. Thus, the "needs scan" indicator is set so that the current processing pass can be considered again in a subsequent cycle, and the chase bit is cleared so that a processing pass from a different sequence of processing passes can be considered in the next cycle (step 922).

If the processing pass does not point to itself, then the chase bit is set, together with a "chasing pointer" that points to the next processing pass in the sequence, so that the next processing pass from the sequence of processing passes will be considered in the next cycle (step 924).

In this way, the sequence chaser 604 will identify sequences of associated processing passes to be checked if they are ready, and when it identifies such a sequence, then progressively check the processing passes in the sequence until it finds that the sequence as a whole is ready, or there is a processing pass in the sequence that is not ready yet (and will then look for another sequence to check, and so on). This therefore facilitates efficiently identifying sequences of associated processing passes in the parking buffer 212 that are ready for processing.

Figure 10:
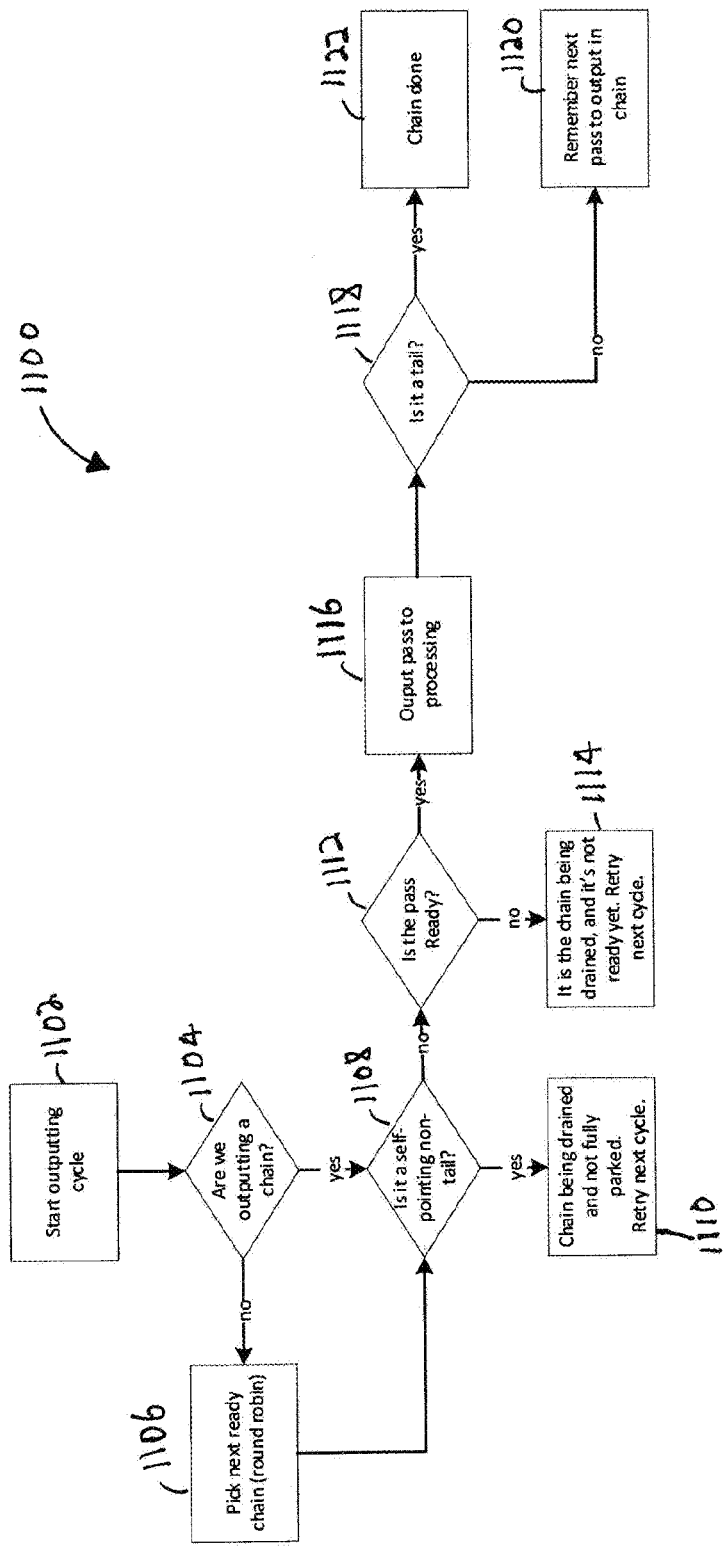
FIG. 10 shows the outputting of processing passes from a record of processing passes stored in a buffer in an embodiment of the technology described herein.

FIG. 10 shows the operation of the sequence ready output scanner 608 and chain traverser 612 of the buffer management circuit 618 in more detail. Again, this Figure shows the operation in one cycle of operation, and so will be repeated for each cycle of operation.

The outputting cycle begins at step 1102. Then, at step 1104, it is determined whether a sequence ("chain") of plural processing passes is currently being output.

If a sequence of processing passes is being output, then the next processing pass in the sequence is selected by the chain traverser 612. As discussed above, in the case where a sequence of processing passes is currently in the process of being output, then the next processing pass in the sequence to be output will be indicated by the "out chain" indicator 526.

If a sequence of plural processing passes is not being output, then in step 1106, the head processing pass of a sequence of processing passes that is ready to be performed is selected for output in a round robin manner by the sequence ready output scanner 608 (using the "chain ready" indicators for the processing pass record entries).

In this way, once a sequence of associated processing passes that is ready for processing is identified, the chain traverser 612 will output the processing passes in that sequence for processing in turn, until the sequence is completed. The sequence ready output scanner 608 will then scan the parking buffer entries for a new sequence of associated processing passes that is indicated as being ready for processing (i.e. has its "chain ready" indicator set), so that that sequence can be output from the parking buffer, and so on.

In either case, in step 1108 it is determined whether the processing pass points to itself but is not the last ("tail") processing pass in a sequence of processing passes. If the processing pass does point to itself but is not the last ("tail") processing pass in a sequence of processing passes, then in step 1110 it is concluded that the sequence of processing passes to which the processing pass belongs is not yet fully parked in the parking buffer and the outputting cycle ends (this may arise in the "drain" mode of operation discussed in more detail below).

If the processing pass is the last ("tail") processing pass in a sequence of processing passes or points to another processing pass in a sequence of processing passes then in step 1112 it is determined whether the processing pass is ready or not (has its "slot ready" indicator set).

If the processing pass is not ready, then in step 1114 it is determined that the current sequence of processing passes is being "drained" from the parking buffer and the outputting cycle ends (the criteria for entering and exiting a process of draining the parking buffer will be described in more detail below). However, if the processing pass is ready then in step 1116 the processing pass is output from the parking buffer and performed.

Then, in step 1118, it is determined whether the processing pass is the last ("tail") processing pass in a sequence of processing passes. If the processing pass is not the last ("tail") processing pass in a sequence of processing passes, then it is noted in step 1120 to consider the next processing pass in the sequence of processing passes in the next outputting cycle. However, if the processing pass is the final processing pass in the sequence, then in step 1122 it is concluded that the outputting of that sequence of processing passes is complete and thus a new sequence of processing passes can be selected in the next outputting cycle.

When a processing pass is output from the record of processing passes, the valid indicator for that processing pass is also unset (cleared) to indicate that the entry in the record of processing passes that corresponded to that processing pass no longer contains valid data.

FIGS. 11A, 11B and 11C show methods of entering and exiting a process of draining processing passes from the parking buffer in the present embodiments. The record in the parking buffer may need to be drained when the record is full or substantially full and/or when no more cache lines are available for allocating to new cache requests (i.e. when all of the cache lines have a reference counter greater than zero and are therefore "locked").

FIG. 11A shows a first option for deciding when the parking buffer should be drained. In this first option, in step 1202, it is detected that there is a single sequence ("chain") of processing passes in the parking buffer that has no last or "tail" processing pass. Then, in step 1204 it is determined whether the parking buffer is full. A full parking buffer may give rise to a situation in which no processing passes can be added to the parking buffer but no processing passes can be output from the parking buffer. Thus, if the parking buffer is full, then in step 1206 the parking buffer is drained by outputting the single sequence of processing passes from the parking buffer (this is despite the full sequence of processing passes not being determined as ready to be performed).

However, if it is determined that the parking buffer is not full, then in step 1208 it is determined whether any further cache lines are available to be allocated for new cache requests. Having no available cache lines can give rise to a situation in which no new processing passes being added to the parking buffer can become ready to be performed. Thus, if no further cache lines can be allocated, then in step 1206 the parking buffer is drained by outputting the single sequence of processing passes from the parking buffer (again this is despite the full sequence of processing passes not being determined as ready to be performed), thereby making further cache lines available for reallocation. However, if further cache lines can be allocated, then in step 1210 the process can continue without needing to drain the parking buffer.

FIG. 11B shows a second option for deciding when the parking buffer should be drained. In this second option, in step 1212 it is determined that no cache lines are available to be allocated for new cache requests. Then, in step 1214 it is determined whether there is a single incomplete sequence of processing passes in the parking buffer. Again, this can give rise to a situation in which no processing passes in the parking buffer can become ready to be performed. Thus, in step 1216 the parking buffer is drained by outputting the single sequence of processing passes from the parking buffer (again this is despite the full sequence of processing passes not being determined as ready to be performed). However, if there is not only a single incomplete sequence of processing pass in the parking buffer, then in step 1218 the process can continue without needing to drain the parking buffer since there will be one or more other complete sequences of processing passes in the parking buffer that can be output instead.

FIG. 11C then shows a method of exiting a process of draining the parking buffer. In step 1220, it is determined that a processing pass is being output. Then in step 1222, is determined whether the processing pass is the last ("tail") processing pass in a sequence of processing passes being drained. If the processing pass is not the last ("tail") processing pass in a sequence of processing passes being drained, then in step 1224 the draining process continues by outputting the current processing pass and selecting the next processing pass in the sequence of processing passes being drained. Conversely, if the processing pass is the last ("tail") processing pass in a sequence of processing passes being drained, then then the single sequence of processing passes that was in the parking buffer has now been output and so in step 1226 is determined that it is no longer necessary to drain the parking buffer.

It should be noted here that processing passes may still be added to the record during the draining process (if one or more new cache lines are available or are not required) and that processing passes in the record may still be considered (scanned) during the draining process. However only the single sequence of processing passes being drained will be output from the record during the draining process. This can help to ensure that the potentially problematic single sequence of processing passes is output from the record and performed, whilst still allowing the record of processing passes to be updated where possible.

Although the above embodiments have been described with particular reference to the operation of graphics processing systems (and in particular in relation to texture data in graphics processing systems), the technology described herein can be used in any data processing system and data processor where plural processing passes are to be performed and in which data to be used in those processing passes is to be cached.

A number of modifications, variations, etc., to the above embodiments would be possible, if desired. For example, the buffer management circuit 618 could comprise plural sequence chasers (sequence chaser circuits) 604, each able to check ("chase") a given sequence of processing passes in a given cycle, such that plural sequences of associated processing passes can be being considered (chased) in parallel in a given cycle of operation.

It would also, for example, be possible to organise the cache so as to allow the storage of the cache line identifiers in the parking buffer to be performed in a more efficient manner. For example, the texture cache could be divided into four parts, with two bits in the cache line index identifying the part in question, with a processing pass being able to use two cache lines from each part of the cache (in the case where processing passes can use up to eight cache lines).

The identifier stored for the processing pass record entries could then be "pre-allocated" to store identifiers from respective parts of the cache, such that, for example, identifier entries 0 and 4 will contain cache lines from part 0, identifier entries 1 and 5 will correspond to part 1, and so on.

Then, for processing pass record entries that can store eight identifiers, the cache part information can be deduced from the position of the identifier in the record entry, which will save two bits from each cache line identifier. For the record entries that can store six identifiers, the first four identifiers could be allocated to parts 0 to 3 (thereby again saving two bits from each cache line index), with identifiers 4 and 5 storing the cache part identifier explicitly (using four bits). For record entries that can store four identifiers, each identifier could use one extra bit that determines the LSB of the part of the cache that the cache line belongs to. For entries that store two identifiers, the cache part information could be indicated explicitly (using four bits).

As will be appreciated from the above, the technology described herein, in its embodiments at least, provides an efficient mechanism for identifying processing passes and sequences of processing passes that are ready to be processed from a "parking buffer", and for correspondingly outputting ready processing passes and sequences of processing passes from the parking buffer for processing.

This is achieved, in the embodiments of the technology described herein at least, by comparing the identifier of an incoming cache line fill against all the parking buffer entries when the line fill happens. In other words, for every cycle, for each processing pass record entry, the cache lines that the processing pass is waiting for are compared to the incoming line fill(s) in that cycle, and if a line fill matches a cache line that a processing pass record entry is waiting for, that is noted. This then allows processing passes in the parking buffer that are ready for execution to be identified and detected immediately the corresponding data is loaded into the cache.

The technology described herein, in its embodiments at least, can achieve increased throughput (e.g. 8 threads per cycle (where one thread corresponds to one output filtered pixel, for example)), using more efficient storage and with increased energy efficiency.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processor, the data processor comprising:
   a processing pass circuit configured to perform processing passes for data processing operations; and
   a cache associated with the processing pass circuit for storing data required by the processing pass circuit when performing processing passes for data processing operations;
   the method comprising:
   storing, in a buffer, a record of processing passes to be performed by the processing pass circuit for data processing operations, including storing, for each processing pass that is recorded in the buffer:
   information indicative of any data that is required for performing the processing pass that is not yet stored in the cache, including an identifier for any data that is required for performing the processing pass that is not yet stored in the cache;
   the method further comprising:
   when new data required by the processing pass circuit to perform a processing pass for a data processing operation is loaded into the cache:
   for each processing pass that is recorded in the buffer and that is awaiting data to be stored in the cache:
      comparing an identifier for the new data that has been loaded into the cache to any identifiers for the processing pass for data that is required for performing the processing pass that is not yet stored in the cache;
      determining, based on the comparison for the processing pass, whether the new data that was loaded into the cache is data that the processing pass was waiting for; and
      when it is determined for the processing pass that the new data that was loaded into the cache was data that the processing pass was waiting for, updating the information indicative of any data that is required for performing the processing pass that is not yet stored in the cache for the processing pass.

2. The method of claim 1, wherein the identifier(s) for any data that is required for performing a processing pass that is not yet stored in the cache that are stored in the processing pass record in the buffer comprise identifiers for the cache lines where the data that is not yet stored in the cache will be stored when it is loaded into the cache.

3. The method of claim 1, wherein the information indicative of any data that is required for performing a processing pass that is not yet stored in the cache that is stored for a processing pass in the buffer comprises:
   one or more identifiers for any data that is required for performing the processing pass that is not yet stored in the cache; and
   a separate indication of any data that is required for performing the processing pass that is not yet stored in the cache.

4. The method of claim 3, wherein updating the information indicative of any data that is required for performing a processing pass that is not yet stored in the cache for the processing pass when it is determined for the processing pass that new data that was loaded into the cache was data that the processing pass was waiting for comprises:

updating the separate indication of any data that is required for performing the processing pass that is not yet stored in the cache to indicate that that new data is now stored in the cache.

5. The method of claim 1, further comprising:
when it is determined for a processing pass that all the data that the processing pass was waiting for has been loaded into the cache, setting a ready indicator for the processing pass to indicate that the processing pass is ready to be output from the record and performed.

6. The method of claim 1, comprising:
when a new processing pass to be performed by the processing pass circuit is received:
first determining whether the data required for the processing pass is already stored in the cache; and
thereafter adding the processing pass to the record of processing passes stored in the buffer, including:
in the case where it is determined that not all of the data that is required for performing the processing pass is already stored in the cache, storing for the processing pass in the buffer information indicative of any data that is required for performing the processing pass that is not yet stored in the cache, including an identifier for any data that is required for performing the processing pass that is not yet stored in the cache; and
in the case where it is determined that all of the data that is required for performing the processing pass is already stored in the cache, setting a ready indicator for the processing pass to indicate that the processing pass is ready to be output from the record and performed.

7. The method of claim 1, wherein a sequence of plural processing passes in the buffer can be associated with each other to indicate that the processing passes in the sequence should be performed as a sequence of processing passes together, and the method further comprises:
when it is determined that all the data that the processing passes in a sequence of associated processing passes was waiting for has been loaded into the cache, setting a sequence ready indicator for the sequence of processing passes to indicate that the sequence of associated processing passes is ready to be output from the record and performed.

8. The method of claim 1, wherein a sequence of plural processing passes in the buffer can be associated with each other to indicate that the processing passes in the sequence should be performed as a sequence of processing passes together, and the method further comprises:
setting, for a processing pass in a sequence of associated processing passes, an indicator to indicate that that processing pass is the next pass in the sequence to be checked if it is ready for processing; and
using the indicators that indicate that a processing pass is the next pass in a sequence of associated processing passes to be checked if it is ready for processing to identify sequences of associated processing passes to check if they are ready for processing.

9. The method of claim 1, wherein the record of processing passes to be performed by the processing pass circuit that is stored in the buffer comprises a plurality of record entries, each able to store a respective processing pass, and different entries in the record have different capacities for storing identifiers for missing data for a processing pass.

10. The method of claim 9, further comprising allocating a processing pass to a processing pass record entry based on the number of identifiers for any data that is required for performing the processing pass that is not yet stored in the cache that need to be stored for the processing pass in the buffer.

11. The method of claim 1, wherein:
the data processor is a graphics processor, the processing pass circuit comprise a graphics texture processing pass circuit, the cache comprises a texture cache, and the data that is required when performing a processing pass comprises graphics texture data.

12. A data processor, the data processor comprising:
a processing pass circuit configured to perform processing passes for data processing operations;
a cache associated with the processing pass circuit for storing data required by the processing pass circuit when performing processing passes for data processing operations;
a buffer for storing a record of processing passes to be performed by the processing pass circuit for data processing operations; and
a buffer management circuit configured to:
add processing passes to be performed by the processing pass circuit for data processing operations to the record of processing passes in the buffer, including storing, for each processing pass that is recorded in the buffer:
information indicative of any data that is required for performing the processing pass is not yet stored in the cache, including an identifier for any data that is required for performing the processing pass that is not yet stored in the cache;
the buffer management circuit further configured to:
when new data required by the processing pass circuit to perform a processing pass for a data processing operation is loaded into the cache:
for each processing pass that is recorded in the buffer and that is awaiting data to be stored in the cache:
compare an identifier for the new data that has been loaded into the cache to any identifiers for the processing pass for data that is required for performing the processing pass that is not yet stored in the cache;
determine, based on the comparison for the processing pass, whether the new data that was loaded into the cache is data that the processing pass was waiting for; and
when it is determined for the processing pass that the new data that was loaded into the cache was data that the processing pass was waiting for, update the information indicative of any data that is required for performing the processing pass that is not yet stored in the cache for the processing pass.

13. The data processor of claim 12, wherein the identifier(s) for any data that is required for performing a processing pass that is not yet stored in the cache that are stored in the processing pass record in the buffer comprise identifiers for the cache lines where the data that is not yet stored in the cache will be stored when it is loaded into the cache.

14. The data processor of claim 12, wherein the information indicative of any data that is required for performing a processing pass that is not yet stored in the cache that is stored for a processing pass in the buffer comprises:
one or more identifiers for any data that is required for performing the processing pass that is not yet stored in the cache; and a separate indication of any data that is required for performing the processing pass that is not yet stored in the cache.

15. The data processor of claim 14, wherein the buffer management circuit is configured to update the information indicative of any data that is required for performing a processing pass that is not yet stored in the cache for a processing pass when it is determined for a processing pass that new data that was loaded into the cache was data that the processing pass was waiting for by:
   updating the separate indication of any data that is required for performing the processing pass that is not yet stored in the cache to indicate that that new data is now stored in the cache.

16. The data processor of claim 12, wherein the buffer management circuit is configured to:
   when it is determined for a processing pass that all the data that the processing pass was waiting for has been loaded into the cache, set a ready indicator for the processing pass to indicate that the processing pass is ready to be output from the record and performed.

17. The data processor of claim 12, further comprising:
   a cache tester circuit configured to, when a new processing pass to be performed by the processing pass circuit is received, determine whether the data required for the processing pass is already stored in the cache;
   and wherein the buffer management circuit is configured to:
   thereafter add the processing pass to the record of processing passes stored in the buffer, including:
      in the case where it is determined that not all of the data that is required for performing the processing pass is already stored in the cache, storing for the processing pass in the buffer information indicative of any data that is required for performing the processing pass that is not yet stored in the cache, including an identifier for any data that is required for performing the processing pass that is not yet stored in the cache; and
      in the case where it is determined that all of the data that is required for performing the processing pass is already stored in the cache, setting a ready indicator for the processing pass to indicate that the processing pass is ready to be output from the record and performed.

18. The data processor of claim 12, wherein a sequence of plural processing passes in the buffer can be associated with each other to indicate that the processing passes in the sequence should be performed as a sequence of processing passes together, and the buffer management circuit is further configured to:
   when it is determined that all the data that the processing passes in a sequence of associated processing passes was waiting for has been loaded into the cache, set a sequence ready indicator for the sequence of processing passes to indicate that the sequence of associated processing passes is ready to be output from the record and performed.

19. The data processor of claim 12, wherein a sequence of plural processing passes in the buffer can be associated with each other to indicate that the processing passes in the sequence should be performed as a sequence of processing passes together, and the buffer management circuit is further configured to:
   set, for a processing pass in a sequence of associated processing passes, an indicator to indicate that that processing pass is the next pass in the sequence to be checked if it is ready for processing; and use the indicators that indicate that a processing pass is the next pass in a sequence of associated processing passes to be checked if it is ready for processing to identify sequences of associated processing passes to check if they are ready for processing.

20. The data processor of claim 12, wherein the record of processing passes to be performed by the processing pass circuit that is stored in the buffer comprises a plurality of record entries, each able to store a respective processing pass, and different entries in the record have different capacities for storing identifiers for missing data for a processing pass.

21. The data processor of claim 20, wherein the buffer management circuit is configured to allocate a processing pass to a processing pass record entry based on the number of identifiers for any data that is required for performing the processing pass that is not yet stored in the cache that need to be stored for the processing pass in the buffer.

22. The data processor of claim 12, wherein:
   the data processor is a graphics processor, the processing pass circuit comprise a graphics texture processing pass circuit, the cache comprises a texture cache, and the data that is required when performing a processing pass comprises graphics texture data.

23. A non-transitory computer readable storage medium storing computer software code which when executing on a graphics processor performs a method of operating a data processor, the data processor comprising:
   a processing pass circuit configured to perform processing passes for data processing operations; and
   a cache associated with the processing pass circuit for storing data required by the processing pass circuit when performing processing passes for data processing operations;
   the method comprising:
   storing, in a buffer, a record of processing passes to be performed by the processing pass circuit for data processing operations, including storing, for each processing pass that is recorded in the buffer:
   information indicative of any data that is required for performing the processing pass that is not yet stored in the cache, including an identifier for any data that is required for performing the processing pass that is not yet stored in the cache;
   the method further comprising:
   when new data required by the processing pass circuit to perform a processing pass for a data processing operation is loaded into the cache:
   for each processing pass that is recorded in the buffer and that is awaiting data to be stored in the cache:
      comparing an identifier for the new data that has been loaded into the cache to any identifiers for the processing pass for data that is required for performing the processing pass that is not yet stored in the cache;
      determining, based on the comparison for the processing pass, whether the new data that was loaded into the cache is data that the processing pass was waiting for; and
      when it is determined for the processing pass that the new data that was loaded into the cache was data that the processing pass was waiting for, updating the information indicative of any data that is required for performing the processing pass that is not yet stored in the cache for the processing pass.

* * * * *